(12) United States Patent
Walker et al.

(10) Patent No.: US 11,488,243 B2
(45) Date of Patent: Nov. 1, 2022

(54) SYSTEMS AND METHODS FOR QUANTITATIVE ORDER ROUTING

(71) Applicant: ROYAL BANK OF CANADA, Montreal (CA)

(72) Inventors: Boston Walker, Toronto (CA); Shary Mudassir, Toronto (CA); Meng Ye, Toronto (CA)

(73) Assignee: ROYAL BANK OF CANADA, Toronto (CA)

(*) Notice: Subject to any disclaimer, the term of this patent is extended or adjusted under 35 U.S.C. 154(b) by 275 days.

(21) Appl. No.: 16/422,679

(22) Filed: May 24, 2019

(65) Prior Publication Data
US 2019/0362422 A1 Nov. 28, 2019

Related U.S. Application Data

(60) Provisional application No. 62/676,084, filed on May 24, 2018.

(51) Int. Cl.
*G06Q 40/04* (2012.01)
*H04L 67/10* (2022.01)

(52) U.S. Cl.
CPC .............. *G06Q 40/04* (2013.01); *H04L 67/10* (2013.01)

(58) Field of Classification Search
CPC ..................................................... G06Q 40/04
See application file for complete search history.

(56) References Cited

U.S. PATENT DOCUMENTS

| | | | | |
|---|---|---|---|---|
| 9,280,791 | B2* | 3/2016 | Rooney | H04L 43/0858 |
| 10,062,115 | B2* | 8/2018 | Taylor | G06Q 40/04 |
| 10,304,097 | B2* | 5/2019 | Daley | G06Q 40/04 |
| 10,937,094 | B1* | 3/2021 | Creamer | G06Q 40/04 |
| 11,158,001 | B2* | 10/2021 | Green | G06Q 40/04 |
| 2008/0097893 | A1* | 4/2008 | Walsky | G06Q 30/0601 705/37 |
| 2009/0313160 | A1* | 12/2009 | Kolten | G06Q 40/04 705/37 |
| 2011/0208634 | A1* | 8/2011 | Sylvester | G06Q 40/04 705/37 |
| 2012/0089496 | A1* | 4/2012 | Taylor | G06Q 40/00 705/35 |
| 2013/0282549 | A1* | 10/2013 | Howorka | G06Q 40/04 705/37 |

(Continued)

*Primary Examiner* — Mohammad Z Shaikh
(74) *Attorney, Agent, or Firm* — Norton Rose Fulbright Canada LLP

(57) ABSTRACT

A smart order router for quantitative trading and order routing and corresponding methods and computer readable media are described. The smart order router includes a machine learning prediction engine configured to, responsive to a control signal received from an upstream trading engine including at least a maximum quantity value and an urgency metric, process input data sets through one or more predictive models to generate the one or more potential combinations of child orders and their associated fill probability metrics, toxicity metrics, and expected gain (loss) metrics and an order placement optimization engine configured to receive the one or more potential combinations of child orders and their associated fill probability metrics, toxicity metrics, and expected gain (loss) metrics and to identify an optimum combination of child orders that maximize an objective function.

15 Claims, 13 Drawing Sheets

(56) References Cited

U.S. PATENT DOCUMENTS

| | | | |
|---|---|---|---|
| 2014/0279344 A1* | 9/2014 | Creamer | G06Q 40/04 |
| | | | 705/37 |
| 2015/0073967 A1* | 3/2015 | Katsuyama | G06Q 30/08 |
| | | | 705/37 |
| 2015/0095207 A1* | 4/2015 | Kodde | G06Q 40/04 |
| | | | 705/37 |
| 2016/0358261 A1* | 12/2016 | Tilly | G06Q 40/06 |
| 2017/0103461 A1* | 4/2017 | Acuna-Rohter | G06Q 40/04 |
| 2017/0279736 A1* | 9/2017 | Pitio | G06Q 40/04 |
| 2018/0040068 A1* | 2/2018 | Noonan | G06N 20/00 |
| 2018/0176320 A1* | 6/2018 | Soni | H04L 67/568 |
| 2018/0197237 A1* | 7/2018 | Gleason | G06Q 40/04 |
| 2018/0232807 A1* | 8/2018 | Crabtree | G06N 5/022 |
| 2019/0035019 A1* | 1/2019 | Jalali | G06Q 40/04 |
| 2019/0108587 A1* | 4/2019 | Green | H04L 67/12 |
| 2020/0327611 A1* | 10/2020 | Weisberger | G06Q 40/06 |

* cited by examiner

SYSTEMS AND METHODS FOR QUANTITATIVE ORDER ROUTING

CROSS-REFERENCE

This application is a non-provisional of, and claims all benefit including priority to U.S. Application No. 62/676,084, entitled SYSTEMS AND METHODS FOR QUANTITATIVE ORDER ROUTING, filed on 24 May 2018, hereby incorporated by reference in its entirety.

FIELD

Embodiments are generally directed to the field of electronic order routing, and more particularly, to machine learning approaches to electronic order routing.

INTRODUCTION

Order routing is an important technical mechanism that is utilized to improve transaction outcomes in relation to orders where there are different characteristics and options available. For example, there may be multiple venues and approaches for transacting in financial instruments, such as exchanges, trading forums such as "dark pools", crossing networks, and directly as between market participants using private contractual agreements.

Different decisions (e.g., order pricing and volume) can be taken in terms of approaches to electronic order routing, including the grouping of order messages, which venues to use, what order type to utilize (e.g., limit orders, market orders, post-only orders, stop-loss orders, buy-stop orders), what order to send messages in, what time to send orders, among others.

Further complicating order routing includes differences in venues, such as priority mechanisms, fee structures (e.g., maker-taker, taker-maker, minimum order sizes), as each venue is designed to attract different characteristic cross-sections of active trading flow, and the varying risk-reward profiles associated with interaction with the cross-section of counterparties represented on each venue.

Order routing faces technical constraints in relation to the availability of time to be able to modify order routing instructions. In particular, there is a very limited window of time available as, especially in very liquid markets, markets are being updated in real-time and an extremely rapid pace. Quotes listed on order books that various exchanges are subject to change and are typically stale within a few hundred microseconds.

Accordingly, order routing and improvements thereof require specific technical improvements to be able to be conducted within a very short timeframe. Modern smart order routers are implemented using specialized hardware and software that are streamlined for speed and computational efficiency, and machine automation is necessary because humans are unable to react quickly enough.

SUMMARY

Systems, devices, methods, and computer readable media are described in various embodiments to generate and transform data structures representative of order configurations, utilized to generate processor execution instructions for transmission to one or more transaction execution processors for execution (e.g., at processors of a trading venue or exchange).

The approaches described herein are adapted to address specific technical challenges that arise in relation to a need to have execution instructions processed before quotes become stale. The risk of stale quotes impacts the ability for execution instructions to be executed, for example, with execution instructions have a price limit and by the time the execution instructions are received, the quote has moved past the price limit, leading to either an undesirable price, or an unfilled order.

Accordingly, various embodiments utilize computational approaches to conduct heuristic or stepwise modifications to a data structure storing a base set of instructions, dynamically modifying the information stored on the data structure until either convergence on an optimized state arises, or a time limit has been reached.

Optimization can be based on an objective function, which, for example, could evaluate to a larger (or smaller if loss function) number. Once a point is reached where making steps in all directions no longer makes that number bigger (i.e., it's found a local maximum), the process stops.

The current order configuration is set of orders the system is maintaining with its downstream controller. When making decisions, the optimization engine starts by initializing the virtual configuration to match the real one, then modifies the virtual configuration to find a better one (not always possible), then modifies the real one to match the new virtual one.

Data structure modification instructions are technically optimized to restrict the modification instructions to a minimal set of instructions to reduce computational effort and time required for enacting the changes. In some embodiments, technical variations are conducted to modify, for example, trading unit sizes, in an effort to reduce computational time.

Specific technical approaches, including modifying how orders are managed in the data structure at a memory address level as well as hash maps are contemplated in some embodiments as mechanisms to improve computation or to more efficiently conduct computation in view of the time constraints as well as constraints on availability of computational resources. Orders are moved between the hash maps with each one representing a unique state of the order requiring a unique instruction to implement that state. Modifying the virtual order configuration generates the set of instructions inherently.

A search scope for attempting to improve the order execution characteristics is expanded by perturbing the potential order execution characteristics through a heuristic stepwise modification process.

As noted herein, the step sizes can be variable some cases and modified dynamically to improve computational efficiency. Computational efficiency is important as for a given finite amount of computational resources more efficiently it can be deployed, the more processing can be done in a constrained period of time. In some embodiments, the latency of execution or processing transmission taken into consideration when determining the amount of constraint time available, as well as the encapsulation and transmission of the execution instructions for downstream processing.

A machine for automated quantitative trading and order routing is described in various embodiments that is configured to utilize a specific machine learning approach that optimizes order placements based on tracked statistical data sets of prior transaction information. The machine is usable, for example, to connect to an order management or automated trading system that interconnects an order-based market with one or more venues. The machine is part of a system that provides a machine-learning oriented approach to decision making within the specific domain of order placement and routing.

The machine tracks an objective function that is being optimized in relation to the order configuration. For a potential trade request that is received, for example, in the form of a data message storing a payload indicating a number and type of securities to be traded, the data message is processed to establish an initial order configuration by the order router. This initial order configuration is then modified in a stepwise manner by conducting transforms against the data elements stored thereon in an attempt to improve an objective function. As described herein, specific technical data structures such as hash maps are used to represent the order configurations to reduce an overall computational burden and increase a speed at which instructions can be implemented.

When a maximum value of the objective function is converged upon, the current virtual order configuration is implemented (instructions are sent). In the event that time has run out and there is no convergence, the instructions are still implemented even though it might not be fully optimal.

Machine learning mechanisms are configured to estimate the probabilities and conditional risk-reward profiles associated with a set of actions and outcomes (order filled, not filled, active order, passive order, market moves away, market moves against us, etc.). As new information is received in the form of data sets, the machine is configured to continuously or periodically re-evaluate the set of outstanding orders and their associated parameters including volume, price, and venue choice within the context of the set of possible outcomes and their estimated probabilities, conditional risk-reward profiles, and costs and/or incentives in order to maximize liquidity capture and minimize risk and cost.

The machine of some embodiments is a special purpose device that is a networked set of computing resources, including at least a computer processor and memory. The special purpose device is a smart order router which is used to optimize transaction execution, and, in some embodiments, operates in conjunction with (e.g., across application programming interfaces (APIs)) or resides within a data center.

Market data, including stock quote information, is aggregated in a statistical aggregation engine that is configured process data sets of market data to generate, for example, moving averages, ratios, and other derivative statistics. Information is pre-processed and transformed for provisioning into a machine learning prediction engine.

The machine learning prediction engine maintains predictive models (in some embodiments, pre-trained neural networks, but not necessarily limited to neural networks) that transform the information received from the statistical aggregation engine, in some cases, along with signals received in relation to market risk and direction indicators (e.g., fair value/quote reversion indicators), to generate estimations of key terms that are utilized by the order placement logic (in a non-limiting example, in an optimizer's objective function).

These terms, for example, can include fill probability, expected toxicity, and trade alpha. An order placement optimizer is then utilized to generate control signals that control the routing of order messages, including for example, messages associated with venues, message type, and a quantity or price.

In a first aspect, there is provided a system for generating, within a constrained duration of time, transaction execution control signals for execution at one or more downstream processing venues representative of a desired trade request, the system comprising: a computer memory adapted to maintain a virtual order configuration data structure and a current order configuration data structure, the virtual order configuration data structure initialized based on the current order configuration data structure; a computer processor configured to: dynamically update the virtual order configuration data structure in accordance with a stepwise optimization mechanism, the stepwise optimization mechanism adapted to: iteratively modify the virtual order configuration data structure by iteratively removing one or more selected orders from the virtual order configuration data structure if an objective function value is increased by doing so; after all removals are conducted, iteratively modify the virtual order configuration data structure by iteratively adding one or more selected orders from the virtual order configuration data structure until if an objective function value is increased by doing so; until convergence to a stable maximum objective function value on an optimal virtual order configuration or upon the constrained duration of time having elapsed, generate, in aggregate, as one or more data processes each corresponding to a corresponding downstream processing venue of the one or more downstream processing venues, the transaction execution control signals based on differences identified between the virtual order configuration data structure and the current order configuration structure; transmit the corresponding data processes to each of the corresponding one or more downstream processing venues for execution; and update the current order configuration data structure and the virtual order configuration data structure based on the execution of the transaction execution control signals at the one or more downstream processing venues.

In another aspect, the virtual order configuration data structure is maintained in one or more hash maps, the one or more hash maps adapted for reducing a level of computational complexity when transforming the virtual order configuration data structure into executable instruction sets.

In another aspect, the computer processor is further configured to: modify an execution order of the transaction execution control signals such that cancellation instructions are processed before modification instructions, and the modification instructions are processed before new order instructions are processed.

In another aspect, the computer processor is further configured to: dynamically determine variable step sizes for stepwise modification of the virtual order configuration data structure.

In another aspect, the executable instruction sets include latency parameters that each correspond to the corresponding downstream processing venue.

In another aspect, the computer processor is further configured to: trigger an evaluation shortcut if an objective value is determined to be below zero to represent a null solution before undertaking the iterative steps of the stepwise modification of the virtual order configuration data structure.

In another aspect, the one or more hash maps each map a series of memory location addresses.

In another aspect, the constrained duration of time is dynamically determined from characteristics of the desired trade request through statistical models based in part on at least one of an order type, a number of securities to be traded, an identifier of the series to be traded, or execution characteristics of the one or more downstream processing venues.

In another aspect, the computer processor resides within a smart order router hardware device.

In another aspect, the transaction execution control signals are encapsulated as a data processes having a series of electronic FIX protocol messages.

In some embodiments, the machine learning prediction engine incorporates both public market data and internal order data in revising the predictive models to adapt for changing market conditions and order flow characteristics.

In some embodiments, the machine learning prediction engine is configured to determine derive a speed of trading and order quantities based on its own models and also an urgency and max quantity that are sent to it from upstream mechanisms.

In some embodiments, the machine learning prediction engine is configured to select an optimal combination of orders to maximize an objective function (e.g., an order placement objective function).

In some embodiments, the generated order messages include new orders, cancellations, and modifications.

Corresponding systems, methods, and computer readable media are contemplated.

BRIEF DESCRIPTION OF FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
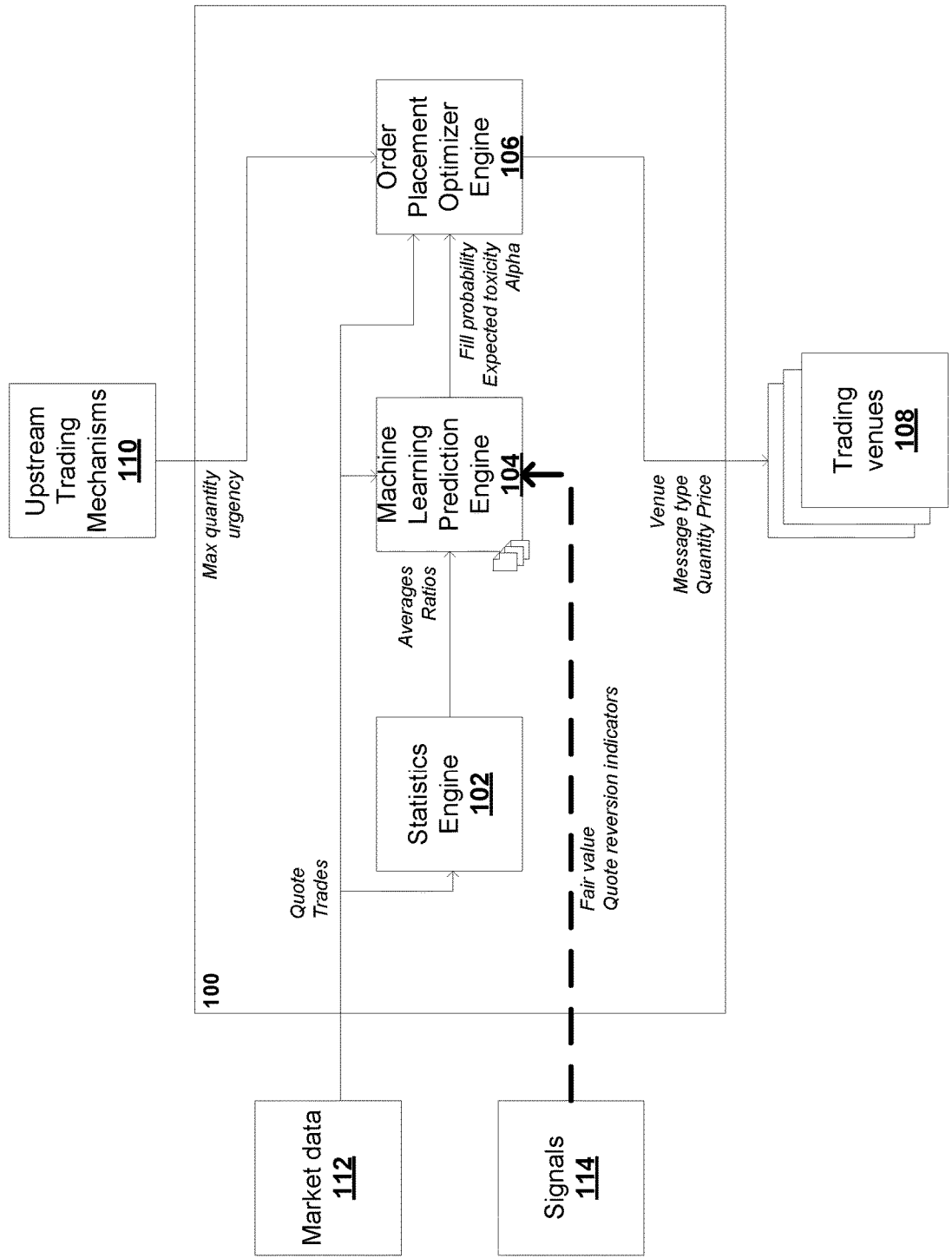
FIG. 1 is a block schematic diagram of an example system for controlling automated routing of order messages, according to some embodiments.

Systems, devices, methods, and computer readable media are described in various embodiments to generate and transform data structures representative of order configurations, utilized to generate processor execution instructions for transmission to one or more transaction execution processors for execution (e.g., at processors of a trading venue or exchange).

The approaches described herein are adapted to address specific technical challenges that arise in relation to a need to have execution instructions processed before quotes become stale. The risk of stale quotes impacts the ability for execution instructions to be executed, for example, with execution instructions have a price limit and by the time the execution instructions are received, the quote has moved past the price limit, leading to either an undesirable price, or an unfilled order.

Quantitative trading and order routing is useful in the context of electronic trading in financial interests. Where a large order is being attempted in the markets, it is likely that no single source of trading liquidity (venues including exchanges, as well as crossing networks or other types of "dark pool" liquidity) is able to match the large order. Accordingly, a large order may need to be split up in a series of smaller "child orders" which have to be routed to multiple sources of liquidity.

The manner in which these child orders are generated and routed is controlled by a smart order router, which is a computer device that is specifically configured to process requests for large orders and help improve execution of the large order as it is split into the child orders. Smart order routers are adapted to generate one or more data processes incorporating one or more order messages corresponding to the child orders.

Optimizing outcomes in quantitative trading and order routing is a difficult technical challenge, as there are myriad linkages having unknown causation and/or correlation with one another. Various embodiments utilize computational approaches to conduct heuristic or stepwise modifications to a data structure storing a base set of instructions, dynamically modifying the information stored on the data structure until either convergence on an optimized state arises, or a time limit has been reached.

Data structure modification instructions are technically optimized to restrict the modification instructions to a minimal set of instructions to reduce computational effort and time required for enacting the changes. In some embodiments, technical variations are conducted to modify, for example, trading unit sizes, in an effort to reduce computational time.

Specific technical approaches, including modifying how orders are managed in the data structure at a memory address level as well as hash maps are contemplated in some embodiments as mechanisms to improve computation or to more efficiently conduct computation in view of the time constraints as well as constraints on availability of computational resources. A search scope for attempting to improve the order execution characteristics is expanded by perturbing the potential order execution characteristics through a heuristic stepwise modification process.

As noted herein, the step sizes can be variable some cases and modified dynamically to improve computational efficiency. Computational efficiency is important as for a given finite amount of computational resources more efficiently it can be deployed, the more processing can be done in a constrained period of time. In some embodiments, the latency of execution or processing transmission taken into consideration when determining the amount of constraint time available, as well as the encapsulation and transmission of the execution instructions for downstream processing.

As described further below, machine learning approaches are utilized to aid in the computer-implemented generation of child orders and routing commands to coordinate one or more attempts to fill the large order. The machine learning approaches can be utilized in various order-based markets with one or more venues, using machine learning models to estimate the risk associated with a set of actions and outcomes (order filled, not filled, active order, passive order, market moves away, market moves against us, etc.).

As new information comes in, the machine learning models are used to continuously or periodically reevaluate the set of outcomes in order to maximize liquidity capture and minimize risk and cost.

These models aid in accommodating complexity that results from market microstructure. For example, Canada has several unique venues, and each has its own priority mechanism and fee structure, and attracts its own characteristic cross-section of active flow. The mechanisms can be used, for example, to choose a passive routing strategy that maximizes the amount of uninformed flow captured while minimizing adverse selection. Many factors matter when making routing decisions:

a. Counterparty. Routing to the right venues helps to reduce the frequency of adverse selection and increase interactions with uninformed flow.
b. Asset type (e.g., Stocks). Microstructure considerations vary according to price, spread, ADV, volatility, and sector or asset class.
c. Priority. Putting passive orders in the right places at the right times will achieve higher fill rates due to time priority, broker priority, and other priorities.
d. Context. An active participant's decision to route to one venue is influenced by trading activity and displayed quantities on all venues throughout the day.
e. Fees. Added costs of routing passive orders to inverted venues need to be justified by better fills.
f. Urgency. Picking and choosing flow is okay sometimes, but other times it is better to take what the system can get for the sake of getting the order completed faster.

A unified solution is implemented using computer and electronic trading mechanisms to optimize passive routing decisions to maximize the quantity and the quality of flow captured in relation to electronic trading requests.

FIG. 1 is a block schematic diagram of an example system 100 for controlling automated routing of order messages, according to some embodiments. The system may include statistics engine 102, machine learning prediction engine 104, and order placement optimizer engine 106. System 100 is an artificial intelligence based router that solves for passive liquidity capture.

The system 100, in a first embodiment, is provided in the form of a hardware device that is a physical networking component configured to receive order instructions and to generate and encapsulate data structures representing execution instructions, encapsulated as data processes, for transmission to trading venue 108 execution processors for execution. In this example, the system 100 can reside in a data center, and may be a computer server that operates in conjunction with a data messaging bus.

The machine learning prediction engine 104 is adapted to interoperate with computer memory, in updating specific data structures storing virtual child orders. To reduce a total number of computational instructions required, instructions are sent and as aggregated changes to be conducted simultaneously as possible. In particular, approaches are allowed first to converge on a good virtual order configuration, and only after convergence are the trade execution instructions implemented.

The statistics engine 102 is configured to receive market data 112 from one or more sources of market data, such as data feeds from exchanges, internal crossing network data, indications of interest, market news, among others, which are then transformed at statistics engine 102 to generate one or more derivative market data sets that may include, for example, moving averages, consolidated statistics, ratios, among others. The statistics engine 102, in some embodiments, acts as a pre-processing step for machine learning prediction engine 104.

The machine learning prediction engine 104 includes pre-trained predictive models to transform market data and aggregate stats into estimations of some key terms in the optimizer's objective function.

The key terms include, for example, (1) fill probability: what is the probability that the child order will be filled?, and (2) toxicity/alpha: conditional on the order being filled, what is the expected gain/loss due to subsequent market movements?

To estimate these two quantities, machine learning models are implemented based, for example, on a combination of TMX™ CDF, a publicly available data source of every order sent by every broker, and a proprietary database of internal order data.

The machine learning prediction engine 104 may also receive signals 114 indicative of a fair value for a particular financial interest, or one or more indications of potential quote reversion for a particular financial interest.

The machine learning models, in some embodiments, include fill probability estimated using logistic regression. For toxicity, linear regression can be utilized to estimate the metric. To provide predictions to the order placement optimizer, the machine learning prediction engine 104 provides an interface (e.g., API) where the optimizer 106 can pass it a potential combination of child orders, and the machine learning prediction engine 104 returns the fill probability and toxicity corresponding to each order. This interface can be invoked multiple times each time the optimizer 106 runs.

The order placement optimizer engine 106 is configured to, responsive to a large order submitted by upstream trading mechanisms 110, including, for example, a max quantity required and an urgency metric, utilize machine learning predictions extracted from the machine learning prediction engine 104 and other available data to estimate the contribution of individual child orders to its objective function and to choose the combination of child orders that will maximize its objective function. A specific example of an approach by the machine learning prediction engine 104 to modify and improve orders is described in further detail in embodiments below.

Given the estimates from the machine learning prediction engine 104, the system 100 is configured to computationally evaluate objective function for any given combination of orders. The order placement optimizer 106 steps through many possible combinations of orders each time it receives new market data, and identifies a most optimal combination. The approach dynamically balances opportunity cost, transaction cost, adverse selection cost, and short-term price predictions in order to achieve best execution for all types of order flow.

The order placement optimizer engine 106 may then issue trading commands, for example, in the form of order messages, to trading venues 108, including messages encapsulated with information relating to a desired venue, message type, quantity, or price, among others. The trading commands, for example, may be implemented in accordance with the FIX protocol.

Accordingly, system 100, in some embodiments, is a machine for automated quantities order routing is described in various embodiments that is configured to utilize a specific machine learning approach that optimizes order placements based on tracked statistical data sets of prior transaction information.

The machine is usable, for example, to connect to an order management or automated trading system that interconnects an order-based market with one or more venues.

Figure 2:
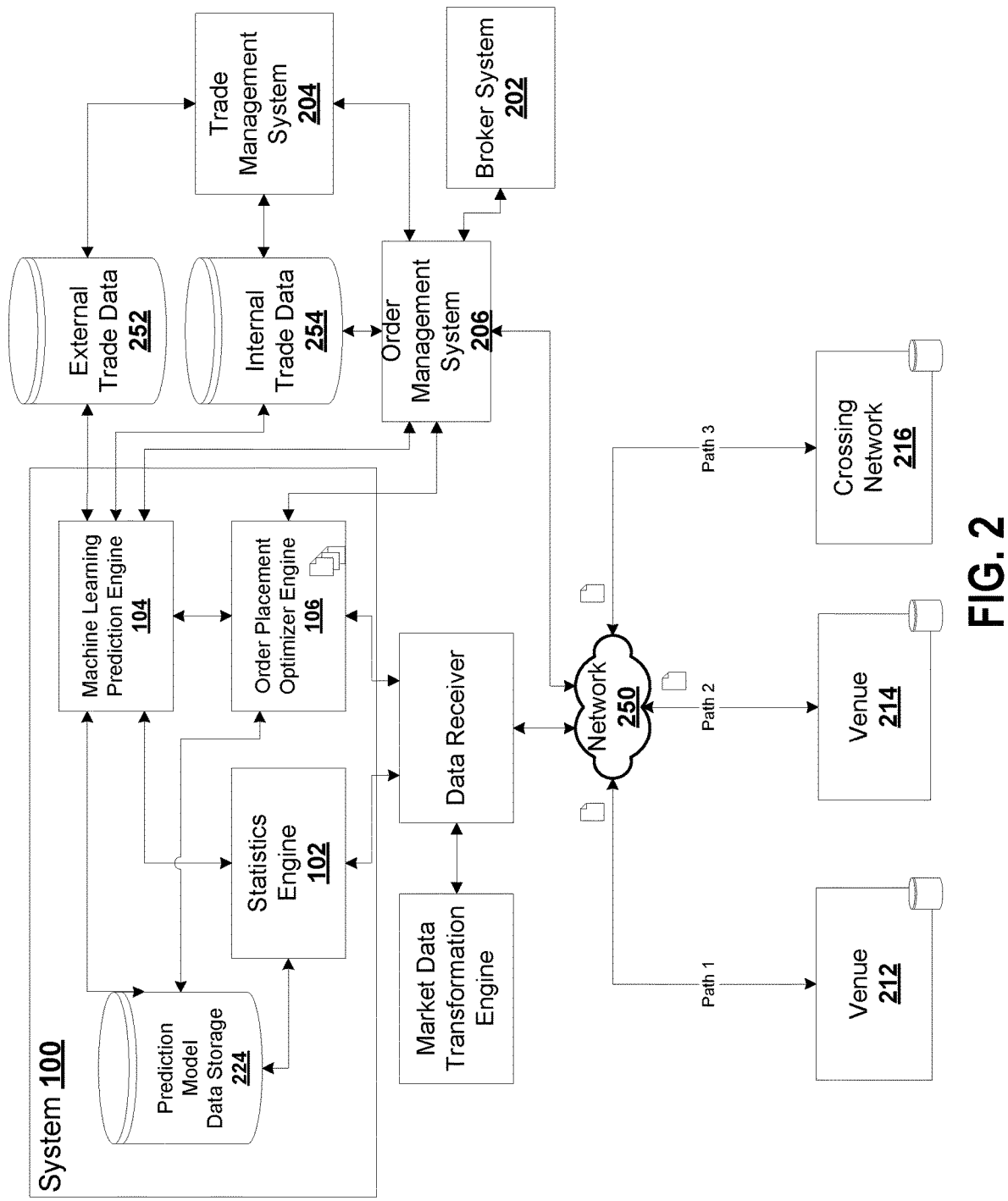
FIG. 2 is a block schematic diagram of an example machine learning engine operating in conjunction with an order management system, according to some embodiments.

FIG. 2 is a more detailed block schematic diagram. In this example, system 100 is shown to further include a prediction model data storage 224, which stores the one or more predictive models as the predictive models are pre-trained/trained, refined, and revised over time. In some embodiments, the one or more predictive models include neural networks having a set of input nodes, hidden nodes, and output nodes, and corresponding linkages and associated weights. The prediction model data storage 224 tracks and maintains data structures representative of baseline order configurations, as well as new data structures representative of virtual order configurations, including metadata and supporting data structures for improving computational efficiency, such as hash map data structures, memory address locations for processing, among others. Orders are moved between the hash maps with each one representing a unique state of the order requiring a unique instruction to implement that state. Modifying the virtual order configuration generates the set of instructions inherently.

The predictive models are configured to estimate the risk associated with a set of actions and outcomes (order filled, not filled, active order, passive order, market moves away, market moves against us, etc.). As new information is received in the form of data sets from external trade data storage 252 and internal trade data 254, the system 100 is configured to continuously or periodically re-evaluate the set of outcomes in order to maximize liquidity capture and minimize risk and cost. Internal and external trade data may be administered and tracked at trade management system 204.

Requests for large orders may arrive from order management system 206, which may be interconnected with broker systems 202 that may originate orders.

The components and/or modules are configured to electronic interaction, including, for example, interfaces to communicate across a network 250, which may be a public network such as the Internet, private networks such as intranets, wide area networks, local area networks, point to point connections, among others. Order messages may be encapsulated and transmitted to venues 212, 214, or crossing network 216 for execution in accordance with instructions stored therein.

The machine of some embodiments is a special purpose device that is a networked set of computing resources, including at least a computer processor and memory. The special purpose device is a smart order router which is used to optimize transaction execution, and, in some embodiments, operates in conjunction with (e.g., across application programming interfaces (APIs)) or resides within a data center.

Market data, including stock quote information, is aggregated in a statistical aggregation engine that is configured process data sets of market data to generate, for example, moving averages, ratios, and other derivative statistics. Information is pre-processed and transformed for provisioning into a machine learning prediction engine.

The machine learning prediction engine maintains pre-trained predictive models that transform the information received from the statistical aggregation engine, in some cases, along with signals received in relation to fair value/quote reversion indicators, to generate estimations of key terms that are utilized in an optimizer's objective function.

These terms, for example, can include fill probability, expected toxicity, and trade alpha. An order placement optimizer is then utilized to generate control signals that control the routing of order messages, including for example, messages associated with venues, message type, and a quantity or price.

Figure 3:
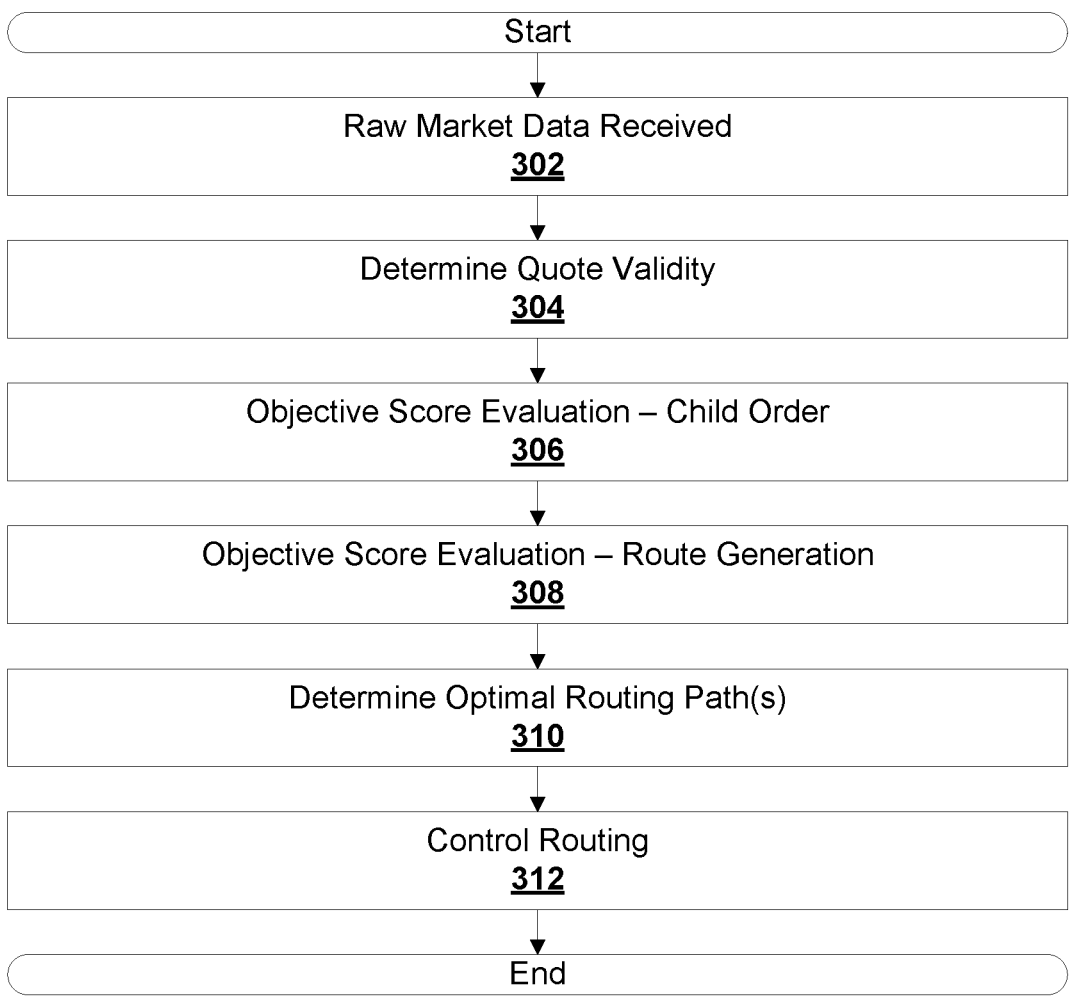
FIG. 3 is a method diagram illustrating the evaluation of the objective function given the estimates from the machine learning prediction engine, according to some embodiments.

FIG. 3 is a method diagram illustrating the evaluation of the objective function given the estimates from the machine learning prediction engine, according to some embodiments. The method begins at 302 with raw market data being received by the statistics engine 102 and or machine learning protection engine 104. The broad market data is utilized to determine whether the market is open if the market is open quotes are then checked to see whether or not there are actually valid quotes.

In some embodiments, quote validity is checked at 304 against a series of factors including, for example, the presence of a speedbump or other type of ability to cancel an order by counterparty. If the quote is valid, the system 100 then checks to see if there are any child orders outstanding. If there are child orders outstanding, the system 100 gets the next child order in a buffer, such as a queue, or a stack, or other type of data structure, and evaluates the objective score, in some embodiments a change in objective score, based on the objective function. This occurs for each child order at 306.

An example objective function is provided below that represents an order placement model. Other objective functions are contemplated and this objective function is shown as a non-limiting example.

Objective functions, for example, can be directed to maximize spread and alpha capture, net of toxicity and fees, with a variable incentive for urgency, while minimizing market impact.

An example objective function can be defined by the following relation:

$$\max_{actions\ \delta} \sum_{orders\ \omega} P(\omega\ \text{filled}) \cdot [\text{spread}(\omega) + \text{alpha} - \text{toxicity}(\omega) - \text{fees}(\omega) + \text{urgency}] - \sum_{actions\ \delta} [K_t \cdot MI_t(\delta) + K_p \cdot MI_p(\delta)]$$

The table below explains the symbols employed in the example function described above.

| Symbol | Meaning |
|---|---|
| $\delta$ | A potential action (new/cancel) that the optimizer can take. Affects a change in an order. |
| $\omega$ | An existing or potential order (quantity, venue, price, order type) that the algorithm can send. |
| P(filled) | Probability of a fill, given order parameters and market conditions (ML model). |
| spread | Difference in price between the order and the mid-quote. Usually half the bid/ask spread. |
| alpha | Expected change in market price (ML model, optional). |
| toxicity | Expected cost of adverse selection, given that the order has been filled (ML model). |
| fees | Fees (rebates) paid to the exchange, given that the order has been filled. |

| Symbol | Meaning |
| --- | --- |
| urgency | Variable parameter from upstream that controls the aggressiveness of liquidity capture. |
| $K_t$ | Cost coefficient of temporary market impact. |
| $MI_t$ | Temporary market impact due to a potential action, e.g. sending a new order. |
| $K_p$ | Cost coefficient of permanent market impact. |
| $MI_p$ | Permanent market impact due to a potential action, e.g. sending a new order. |

Each child order is associated with a change in objective score and the system in some embodiments, iteratively determines routes for each child order, such that a number of routes are generated and associated with combinations of routed child orders at 308 such that each route is associated with a change in objective score and overall route with a maximum change in objective score is determined iteratively, in some embodiments, and selected as an optimal routing path at 310.

An optimal routing path for the child orders, in some embodiments, stored in a data structure or a set of data processes, which are then provided to an order placement optimizer engine 106, for routing across network 250 or more venues 212, 214, or crossing network 216 for execution at 312.

Figure 4:
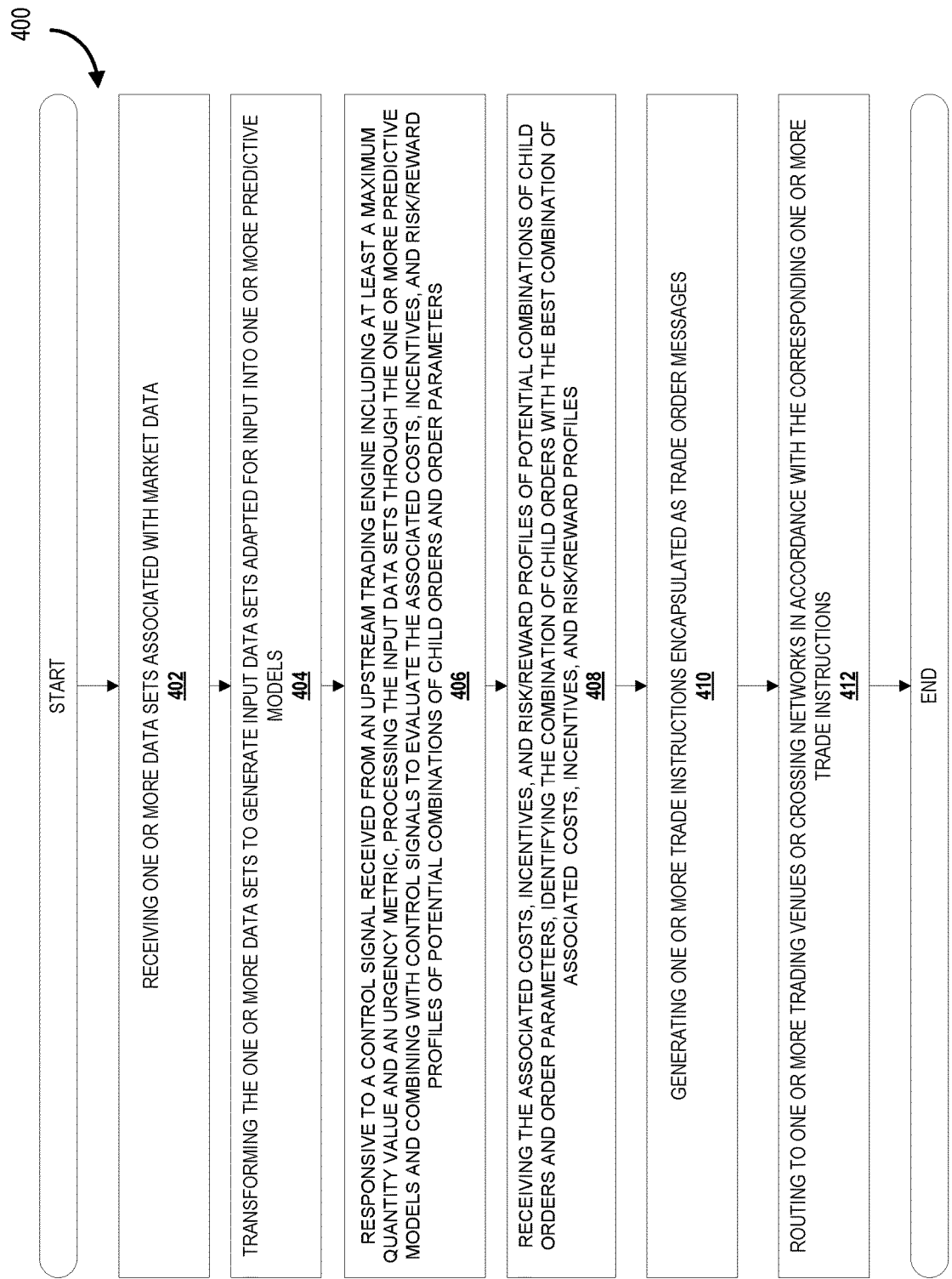
FIG. 4 is a method diagram for an example process for quantitative trading and order routing, according to some embodiments.

FIG. 4 is a method diagram for an example process for quantitative trading and order routing, according to some embodiments.

At 402, a market data receiver receives one or more data sets associated with market data. At 404, a market data transformation engine configured to process the one or more data sets to generate input data sets adapted for input into one or more predictive models adapted for generating one or more combinations of child orders, each child order associated with a corresponding fill probability metric, a toxicity metric, and an expected gain (loss) metric.

At 406, the machine learning prediction engine 104, responsive to a control signal received from an upstream trading engine/mechanism 110 including at least a maximum quantity value and an urgency metric, processes the input data sets through the one or more predictive models to generate the one or more potential combinations of child orders and their associated fill probability metrics, toxicity metrics, and expected gain (loss) metrics.

At 408, the order placement optimization engine 106 receives the one or more potential combinations of child orders and their associated fill probability metrics, toxicity metrics, and expected gain (loss) metrics and to identify an optimum combination of child orders that maximize an objective function.

At 410, the trade order message generation engine or the order placement optimizer engine 106 generates one or more trade instructions encapsulated as trade order messages corresponding to the child orders of the optimum combination of child orders, the trade order messages for routing at 412 to one or more trading venues 212, 214 or crossing networks 216 in accordance with the corresponding one or more trade instructions.

Figure 5:
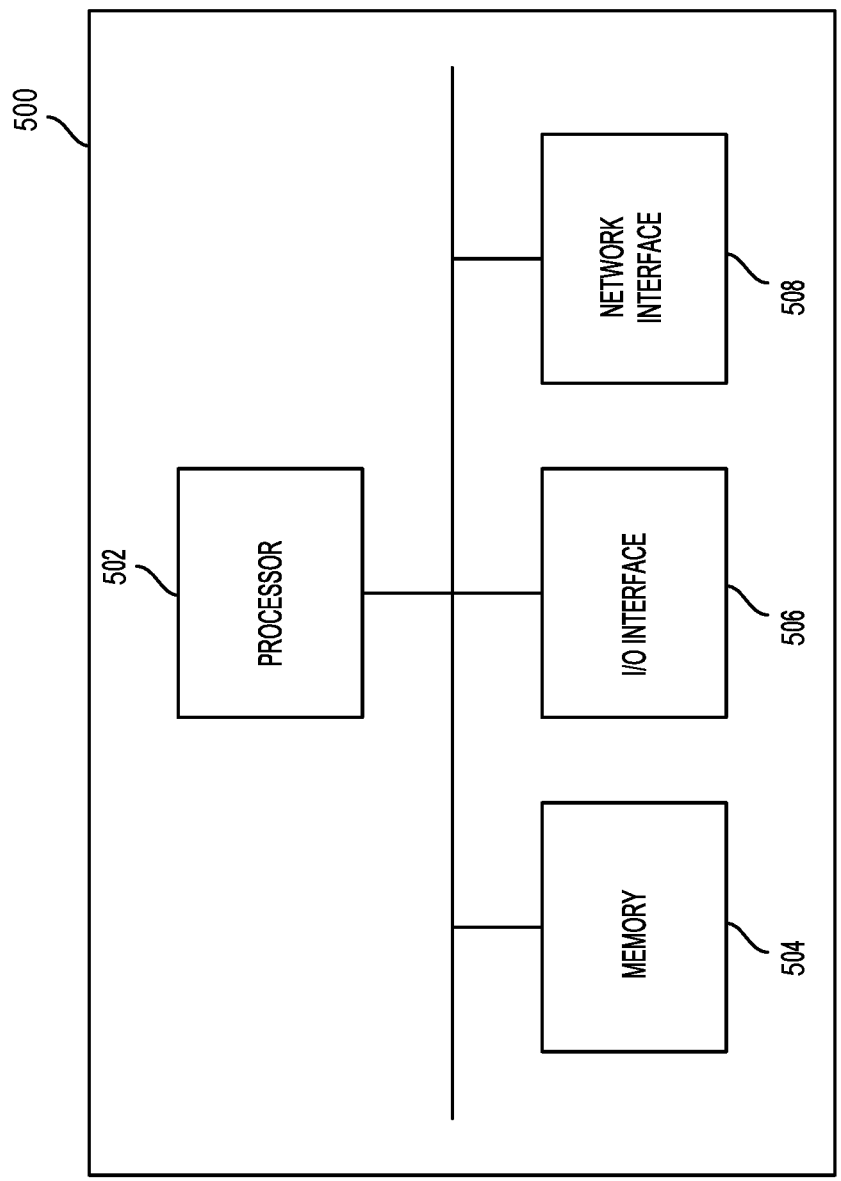
FIG. 5 is a block schematic of an example computing device, according to some embodiments.

FIG. 5 is a schematic diagram of a computing device 500 such as a server. As depicted, the computing device includes at least one processor 502, memory 505, at least one I/O interface 506, and at least one network interface 508.

Processor 502 may be an Intel or AMD x86 or x64, PowerPC, ARM processor, or the like. Memory 504 may include a suitable combination of computer memory that is located either internally or externally such as, for example, random-access memory (RAM), read-only memory (ROM), compact disc read-only memory (CDROM).

Each I/O interface 506 enables computing device 500 to interconnect with one or more input devices, such as a keyboard, mouse, camera, touch screen and a microphone, or with one or more output devices such as a display screen and a speaker.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

Computing device 500 is operable to register and authenticate users (using a login, unique identifier, and password for example) prior to providing access to applications, a local network, network resources, other networks and network security devices. Computing devices 500 may serve one user or multiple users.

Figure 6:
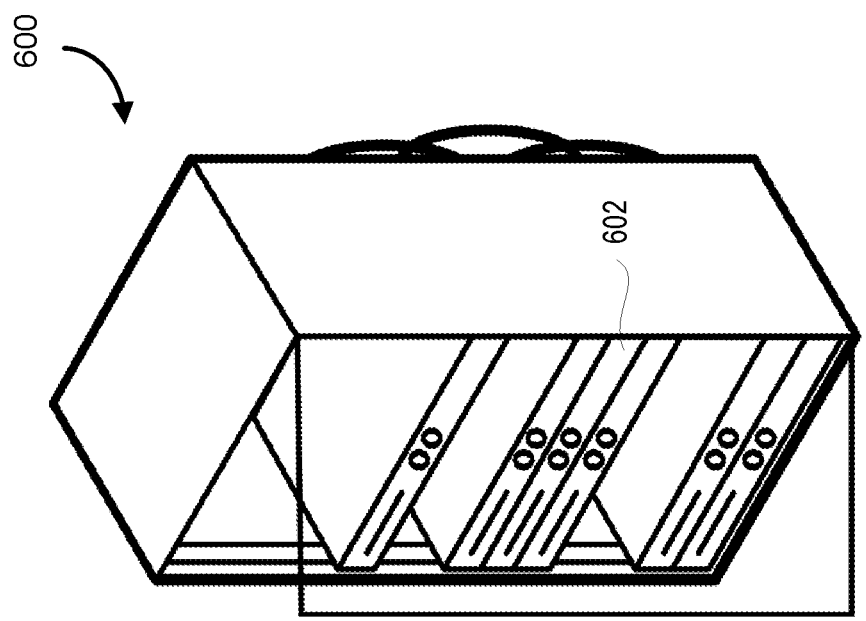
FIG. 6 is an illustration of a data center residing special purpose machine, according to some embodiments.

FIG. 6 is an illustration of a special purpose machine 602, according to some embodiments that may reside at data center.

The special purpose machine 602, for example, incorporates the features of the system 100 and is provided in a portable computing mechanism that, for example, may be placed into a data center as a rack server or rack server component that interoperates and interconnects with other devices, for example, across a network or a message bus.

The special purpose machine 602, in some embodiments, is a smart order router designed to control trade routing and generation of trade order messages which represent potential transactions and financial interests that may, for example, be provided in the form of one or more data processes.

The smart order router is able to control timing volume, size, quantity, and other characteristics of the potential transaction. For example, generated trade order messages may include header information which is utilized to determine various characteristics, the header information along with the trade order messages, when processed at one or more corresponding computing devices at liquidity sources, is utilized to determine and execute the underlying transaction in the financial interest.

The process conducted by the smart order router includes evaluating a set of possible order configurations (virtual order configurations) and choosing successive configurations such that the "goodness" of the configurations is consistently increased.

The "goodness" of a given order configuration is represented as an objective function to be optimized. Due to the quantity and nature of parameters and decision variables involved, the objective function is expected to be highly complex and not efficiently solvable by traditional optimization methods within the time period required for the system to have an optimal latency profile.

Therefore, a heuristic step-wise search algorithm is defined that includes several significant optimizations aimed at finding an approximately optimal order configuration.

The objective function itself must be designed to encapsulate all considerations in a way as to create an objective measure of the "goodness" of a particular set of child orders.

Within typical algorithmic trading applications this objective function usually involves such parameters as: probability of being filled, expected rate of incoming fills, spread between the order price and a measure of fair value, expected adverse selection profiles given that the order is filled, expected price movements in the future, costs associated with additional time and/or risk incurred in executing, difference between current prices and a benchmark price, an urgency penalty or weighting, fees associated with trading on a certain execution mechanism, market impact profile due to an order, and other incentives or penalties associated with different configurations of orders.

Stochastic quantities such as adverse selection, future price movements, fill probabilities, and market impact are not definitively known at the time of decision-making and must be estimated using models.

The general form of the objective function is as follows:

$$\max_{set\ of\ actions\ \Delta} goodness(\Delta, \Omega(\Delta))$$

Where $\Delta$ is a set of actions $\delta$ that will be taken to implement a given order configuration $\Omega$, which is a set of orders $\omega$.

An example of a common form of the objective function that can be estimated using the provided algorithm implementation is the following:

$$\max_{set\ of\ actions\ \Delta} \sum_{orders\ \omega \in \Omega(\Delta)} goodness(\omega) + \sum_{actions\ \delta \in \Delta} goodness(\delta)$$

This form of the objective function is compatible with the stepwise function because the contribution of each separate order and separate action to the total objective can be separated and counted separately at each step.

Stochastic parameters are parameters in the objective function such as fill probability, adverse selection profile, and market impact that affect the optimality of decisions made, but are unknown and noisy quantities that vary with market conditions and child order configurations. In order to provide adaptability to changing market conditions, stochastic parameters are estimated using models that are updated as market data, statistics about market data, and order parameters are varied.

Models are human-designed and/or machine learning algorithms that electronically transform statistics (as represented by bytes, integers, strings, floating-point values, etc. in computer memory) into useful predictions and other inferences in order to create similar electronic estimates of stochastic properties of the market environment and/or specific orders.

These predictions are used directly in optimization and other decision-making. Statistics may be sums, products, quotients, moving averages, last values, weighted averages, quantiles, minima, maxima, median values, and combinations thereof. Models may be custom algorithms, averages, linear weightings, logistic regressions, nearest neighbour algorithms, Bayesian models, decision trees, random forests, nonlinear regressions, support vector machines, neural networks, and/or combinations of and ensembles thereof.

Models have parameters that are derived from human design and/or inference from data that are stored electronically and must be accessed by the system in order to estimate stochastic quantities as new data are processed. Model parameters can be updated manually, as in the case of human-designed algorithms, periodically with new data files that are derived from analysis of historical datasets of transactions, or in the case of "on-line" learning, model parameters can be updated by machine learning logic encapsulated in the system itself.

An example configuration of the stepwise optimization approach is given below:
1. Market data/order update electronic dataset received. New information about the market environment and/or order parameters which much be adhered to is contained in the electronic payload of this dataset.
2. If market data update, payload is used to recalculate statistics for input to models.
3. Provide statistics, order parameters to models
4. (Initialization) Initialize the virtual order configuration
   a. Clear new, modify, cancel hash map data structures
   b. Write all child orders to the unmodified hash map data structure
5. The virtual order configuration is now configured to exactly match the current realized order configuration with the downstream controller
6. For each existing child order:
   a. Given the current and past state of the order and given all statistics representing the current market environment, evaluate each model to create estimates of all stochastic quantities affecting the score of the child order
   b. Using the child orders parameters, market data, the estimates calculated from the models, and the configuration of all other child orders, evaluate the contribution of the child order to the total score of the current virtual order configuration
7. The total score of the current virtual order configuration is the sum of the scores of each child order
8. (Reversion shortcut) If the total score of the current virtual order configuration is less than zero, the configuration where no quantity was outstanding (i.e. all orders were cancelled) would have an improved score versus the current configuration, and:
   a. For each existing child order:
      i. The quantity is set to zero
      ii. The mapping of the order's current memory address by the hash map representing existing unmodified orders is removed
      iii. The order is mapped to a new memory address by the hash map corresponding to cancelled orders
   b. The current virtual order configuration now represents a state where all existing orders are cancelled
9. (Additional Initialization) If an algorithm is configured for performing additional initialization:
   a. Use the algorithm to generate a new initialization for the virtual order configuration
   b. Differentiate the new initialization with the current state of the virtual order configuration with the new initialization to produce the mutations (as represented by the state of data structures in memory) necessary to implement the new initialization
10. (Main approach) For each of the following step sizes: 25*board lot size, 5*board lot size, 1*board lot size:
    a. (Halting) If a pre-specified time limit has been reached, the current virtual order configuration as encoded by the data structures in memory will be considered as optimal as was possible to find within the time limit, therefore go to step 11.
b. For each existing child order:
  i. Given the current and past state of the order and given all statistics representing the current market environment, evaluate each model to create estimates of all stochastic quantities affecting the score of the child order
  ii. Using the child orders parameters, market data, the estimates calculated from the models, and the configuration of all other child orders, evaluate the contribution of the child order to the total score of the current virtual order configuration
c. The total score of the current virtual order configuration is the sum of the scores of each child order
d. For each existing child order with quantity greater than or equal to the step size:
  i. Evaluate the change in contribution of the child order to the total score of the current virtual order configuration in the scenario where the quantity of the child order was to be reduced by the step size
  ii. For each other existing child order:
    1. Evaluate the change in contribution of the other child order to the total score of the current virtual order configuration in the scenario where the quantity of the first child order were to be reduced by the step size
  iii. The change in total score of the current virtual order configuration in the scenario that the child order was reduced by the step size is equal to the sum of all changes in contributions from steps i. and ii.
e. If one or more scenarios evaluated in d. created a net positive change to the score of the virtual order configuration, for the scenario with the largest positive change:
  i. The child order corresponding to the scenario with the largest positive change will be reduced by the step size in the virtual order configuration
  ii. If the order is in a memory address corresponding to the hash map representing existing unmodified orders:
    1. The quantity of the order is reduced by the step size
    2. The mapping of the order's current memory address by the hash map representing existing unmodified orders is removed
    3. If the remaining quantity is positive, the order is mapped to a new memory address by the hash map corresponding to modified orders
    4. If the remaining quantity is zero, the order is mapped to a new memory address by the hash map corresponding to cancelled orders
  iii. Otherwise, if the order is in a memory address corresponding to the hash map representing modified orders:
    1. The quantity of the order is reduced by the step size
    2. If the remaining quantity is zero:
      a. The mapping of the order's current memory address by the hash map representing modified orders is removed
      b. The order is mapped to a new memory address by the hash map corresponding to cancelled orders
  iv. Otherwise, if the order is in a memory address corresponding to the hash map representing new virtual orders:
    1. The quantity of the order is reduced by the step size
    2. If the remaining quantity is zero:
      a. The mapping of the order's current memory address by the hash map representing new virtual orders is removed
      b. The data structure representing the new virtual order is discarded
  v. The virtual order configuration has now been mutated
  vi. Go back to step a.
f. If no scenario created a positive change, no mutation will be made to the virtual order configuration at this stage
g. For each unique and valid exchange/order type/order parameter combination:
  i. Perform a lookup in a hash map encoding exchange, order type, and order parameters to check if there is an existing new virtual child order
  ii. If there is an existing new virtual child order for the same exchange/order type/order parameter combination (i.e. the lookup returns an address in memory), evaluate the change in contribution of the new virtual child order to the total score of the current virtual order configuration in the scenario where the quantity of the child order was to be increased by the step size
  iii. If there is no existing virtual child order for the same exchange/order type/order parameter combination, evaluate the contribution of a new virtual child order with the same exchange/order type/order parameter combination and quantity equal to the step size to the total score of the new virtual order configuration
  iv. For each other existing child order, evaluate the change in contribution of the other child order to the total score of the current virtual order configuration in the scenario where the quantity of the new virtual child order was to be increased by the step size
  v. The change in total score of the current virtual order configuration in the scenario total quantity outstanding with the same exchange/order type/order parameter contribution was increased by the step size is equal to the sum of all changes in contributions from steps ii., iii., and iv.
h. If one or more scenarios evaluated in g. created a net positive change to the score of the virtual order configuration, for the scenario with the largest positive change:
  i. The exchange/order type/order parameters corresponding to the scenario with the largest positive change will received added quantity equal to the step size in the virtual order configuration
  ii. Perform a lookup in a hash map encoding exchange, order type, and order parameters to check if there is an existing new virtual child order
  iii. If there is an existing new virtual child order for the same exchange/order type/order parameter combination (i.e. the lookup returns an address in memory), the quantity of the existing new virtual child order is increased by the step size iv. If there is no existing virtual child order for the same exchange/order type/order parameter combination:
1. Initialize a new data structure in memory corresponding to a new virtual child order placed with the exchange/order type/order parameters, having quantity equal to the step size
2. The data structure is mapped to a new memory address by the hash map encoding exchange/order type/order parameters for new virtual child orders
v. The virtual order configuration has now been mutated
vi. Go back to step a.
i. If no scenario created a positive change, no mutation will be made to the virtual order configuration at this stage
j. If no mutation has been made to the virtual order configuration for this pass, the step size will be reduced
k. If the step size is already at the minimum (i.e. 1 standard trading unit), the optimal virtual order configuration has been reached, as encoded by the data structures in memory
11. For each data structure that is mapped into memory by the hash map representing orders to be cancelled, an electronic instruction is sent to the downstream controller to cancel the corresponding order, with a payload identifying the order using a unique identifier
12. For each data structure that is mapped into memory by the hash map representing orders to be modified, an electronic instruction is sent to the downstream controller to modify the corresponding order, with a payload identifying the order using a unique identifier and containing the new desired quantity outstanding for that order
13. For each data structure that is mapped into memory by the hash map representing new orders to be creased, an electronic instruction is sent to the downstream controller to create the corresponding order, with a payload containing all of the required order parameters including but not limited to stock symbol, side, quantity, price, exchange, order type, and other order parameters
14. The order configuration implemented by instructions to the downstream controller now represents the optimal order configuration, as estimated by the stepwise search algorithm. The algorithm is finished.

Virtual Order Configurations

In order to find an optimal order configuration, the stepwise optimization algorithm must quickly evaluate many different possible configurations of orders. To evaluate configurations, the optimization algorithm at each step individually updates each order with predictions of stochastic quantities (i.e. fill probability, adverse selection, market impact) that take into account the order's current state, the history of the order, as well as market conditions and interaction effects between multiple orders. So for evaluation purposes, the system track information about each order in the potential configuration.

The current potential configuration being tracked by the system is called the "virtual" order configuration, and it may include a combination of orders that were already created previously and exist downstream ("realized" orders) as well as orders that are proposed but do not yet exist ("virtual" orders).

Maintaining a virtual order configuration is necessary because if the algorithm were to send instructions downstream (i.e. affect real orders on the exchanges/liquidity mechanisms) each time it changed its order configuration, this would lead to:

The risk of information from order instructions causing other market participants to change their behaviour, causing multiple new market data updates to be received mid-optimization, which would lead to indefinite re-optimization and a reduction in latency/throughput/responsiveness;

The risk of information from order instructions causing other market participants to change their behaviour in such a way as to create feedback loops of repeating and unnecessary behaviour;

A high "message rate", which could incur non-trivial costs from the exchanges and possible be flagged by exchanges or regulators;

Increased latency due to an increased number of interactions with the downstream controller; or The risk of immediate reaction from other market participants on an order configuration that is less than-optimal, leading to a lower amount of liquidity capture or a higher degree of adverse selection than otherwise.

Because of these shortcomings, it is better to send all changes in aggregate and as simultaneously as possible. The problem is solved by allowing the algorithm first to converge on a good virtual order configuration, and then to implement the configuration by sending messages to a downstream controller.

Combined Approach with Stepwise Optimization

Given two data representations: (1) The current "realized" configuration of all orders existing with the downstream controller; and (2) A desired "virtual" configuration of orders, it is possible to compute the minimal set of instructions required to send to the downstream controller in order to implement the desired virtual configuration by looking at the differences in quantities of orders within each unique set of order routing parameters.

However, doing this differential comparison is a time-consuming process that increases latency.

Since the stepwise optimization algorithm begins with the current realized order configuration and then mutates it into successive virtual order configurations until convergence, it is possible to track the set of mutations that led from the realized order configuration to the optimal virtual order configuration and translate the mutations into a set of instructions. Therefore, the latency of the system can be reduced by combining the process of optimizing a virtual order configuration as well as tracking mutations.

New/CFO/Cancel State Management

Figure 7:
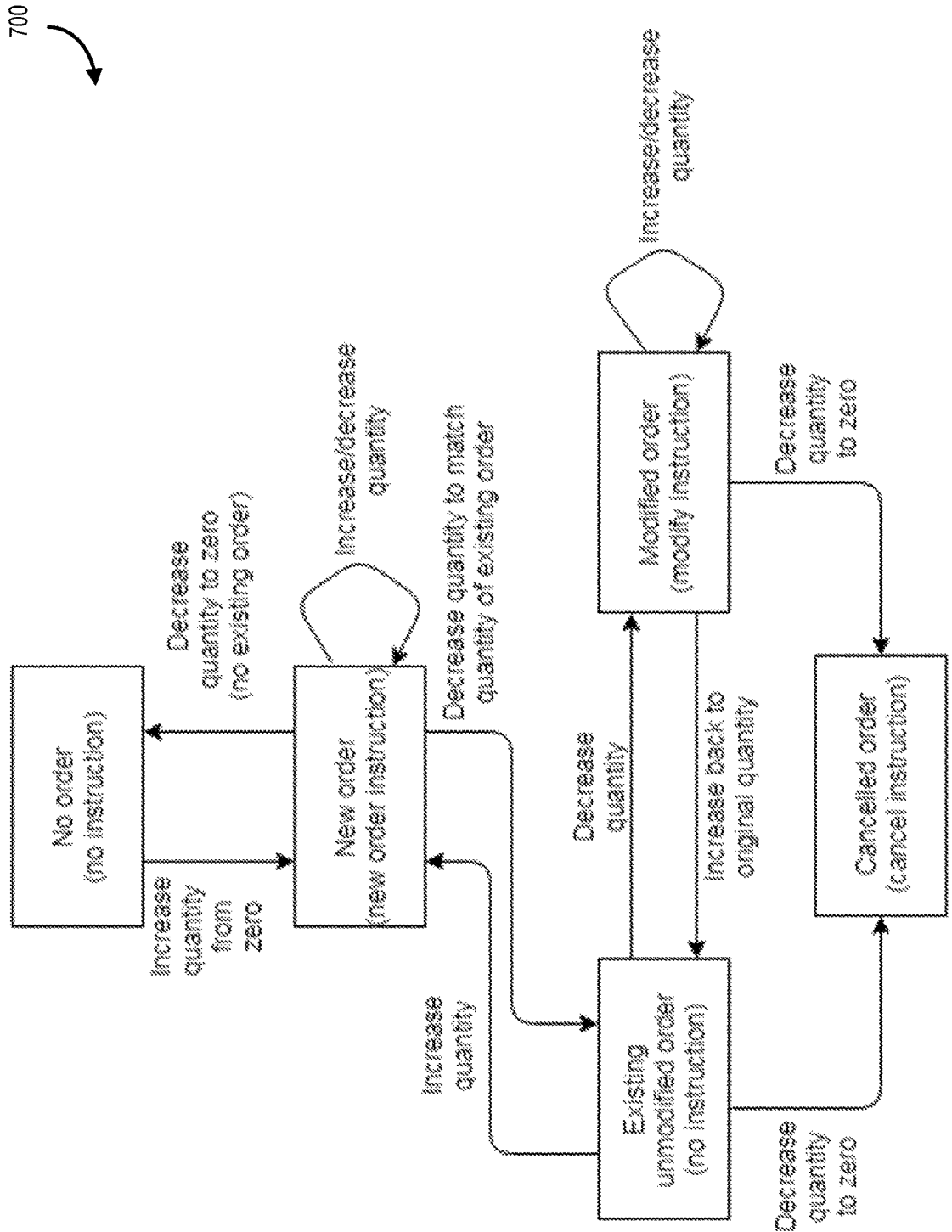
FIG. 7 is a process diagram illustrating an example method for determining virtual order configurations and selecting from among the candidate configurations, a selected configuration for establishing execution instructions, according to some embodiments.

During execution of the stepwise optimization algorithm, mutations to the virtual order configuration are tracked for the purposes of translation into instructions to the downstream controller. Depending on the state of the virtual orders in the current virtual order configuration, and the desired step (adding or removing quantity) the following order mutations are possible:

FIG. 7 is a process diagram illustrating an example method for determining virtual order configurations and selecting from among the candidate configurations, a selected configuration for establishing execution instructions, according to some embodiments.

For each realized or virtual order, depending on the path taken by the optimization algorithm, the set of mutations will end up in one of the 5 final states shown in diagram 700 of FIG. 7:

1. No modification, no instruction sent
2. Modified (quantity reduced), modify instruction sent 3. Cancelled, cancel instruction sent
4. New virtual order, new order instruction sent
5. No new virtual order, no instruction sent Depending on the final state of each order (realized or virtual), a single instruction per order may or may not be sent. Since each order can only occupy one state depending on the relationship between the realized quantity existing with the downstream controller and the virtual quantity assigned to it, when mutating the virtual order configuration, it is sufficient to track the realized and virtual quantities together to deduce both its current state and the new state.

Since both current state and new state can be easily known based on the realized and virtual quantities of an order each time it is mutated, each mutation to the virtual order configuration is implemented as a set of two operations:

1. A removal of the order from a data structure containing all other orders with its current state (unless the order is a new virtual order, in which case it has no previous state); and
2. An addition of the order to a new data structure containing all other orders with its new state The data structures corresponding to each state are effectively maps that need to support put, read, and remove operations for orders. Since each order contains a unique identifier or combination of attributes that identify it, the data structures corresponding to each state are implemented as "hash maps", i.e. they contain "hashing functions" which map the identifying information for each order to small sets of orders with the same value for the hash function.

These smaller sets are implemented, in some embodiments, as linked lists, which can then be traversed quickly due to their reduced size.

Figure 8:
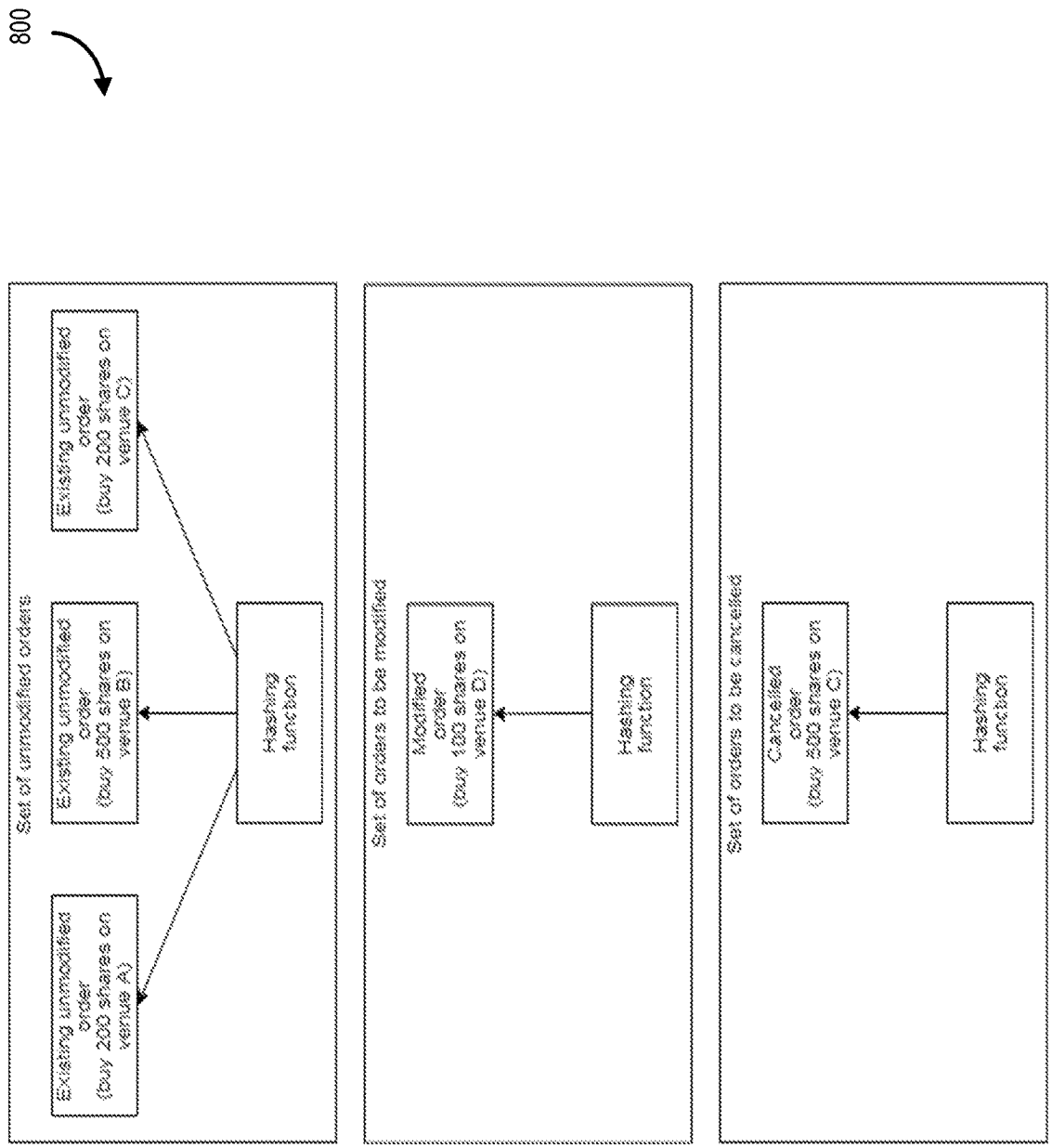
FIG. 8, FIG. 9, FIG. 10, FIG. 11, and FIG. 12 are block diagrams of example virtual order configurations, according to some embodiments. respectively.
Figure 9:
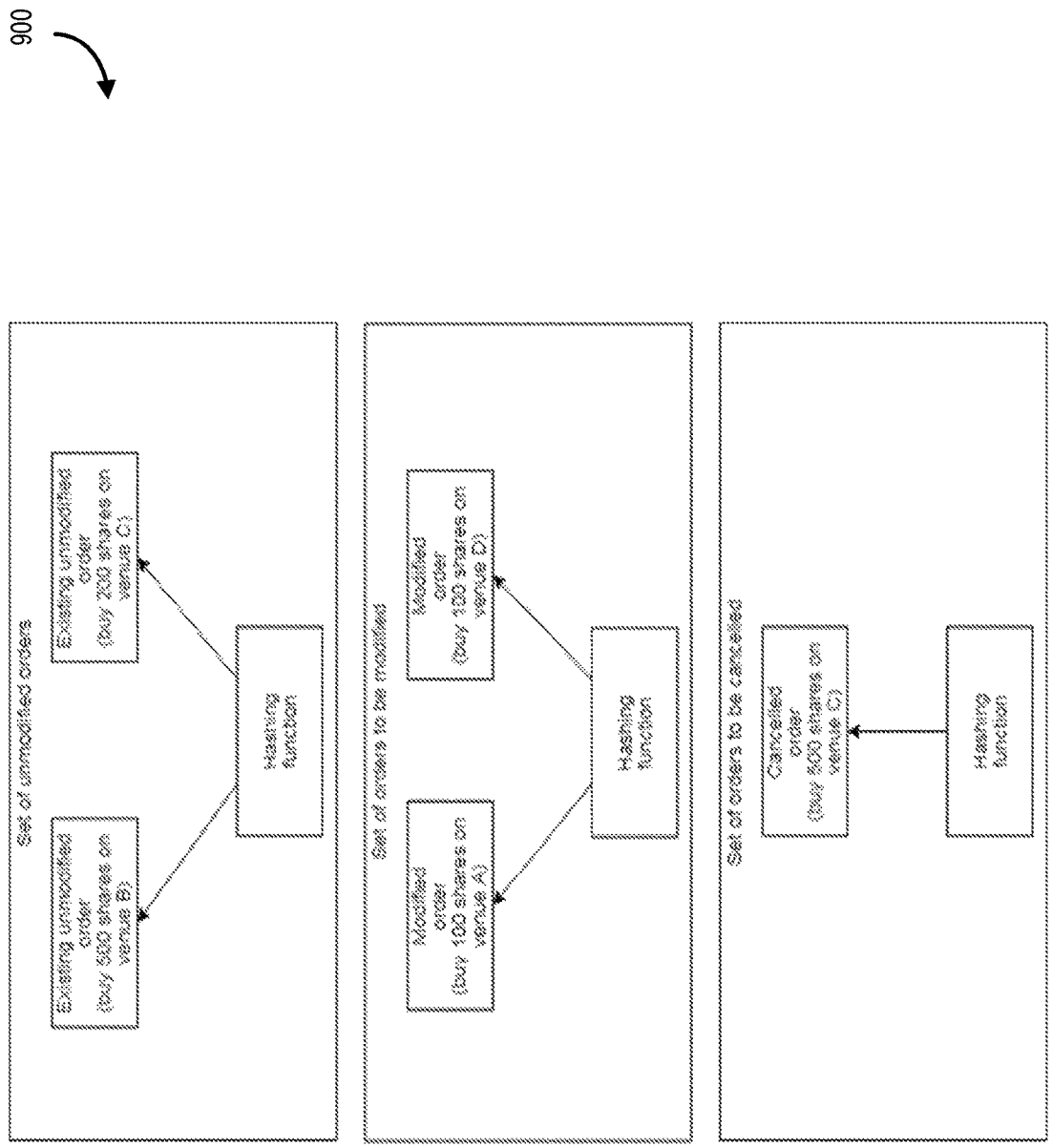
Figure 10:
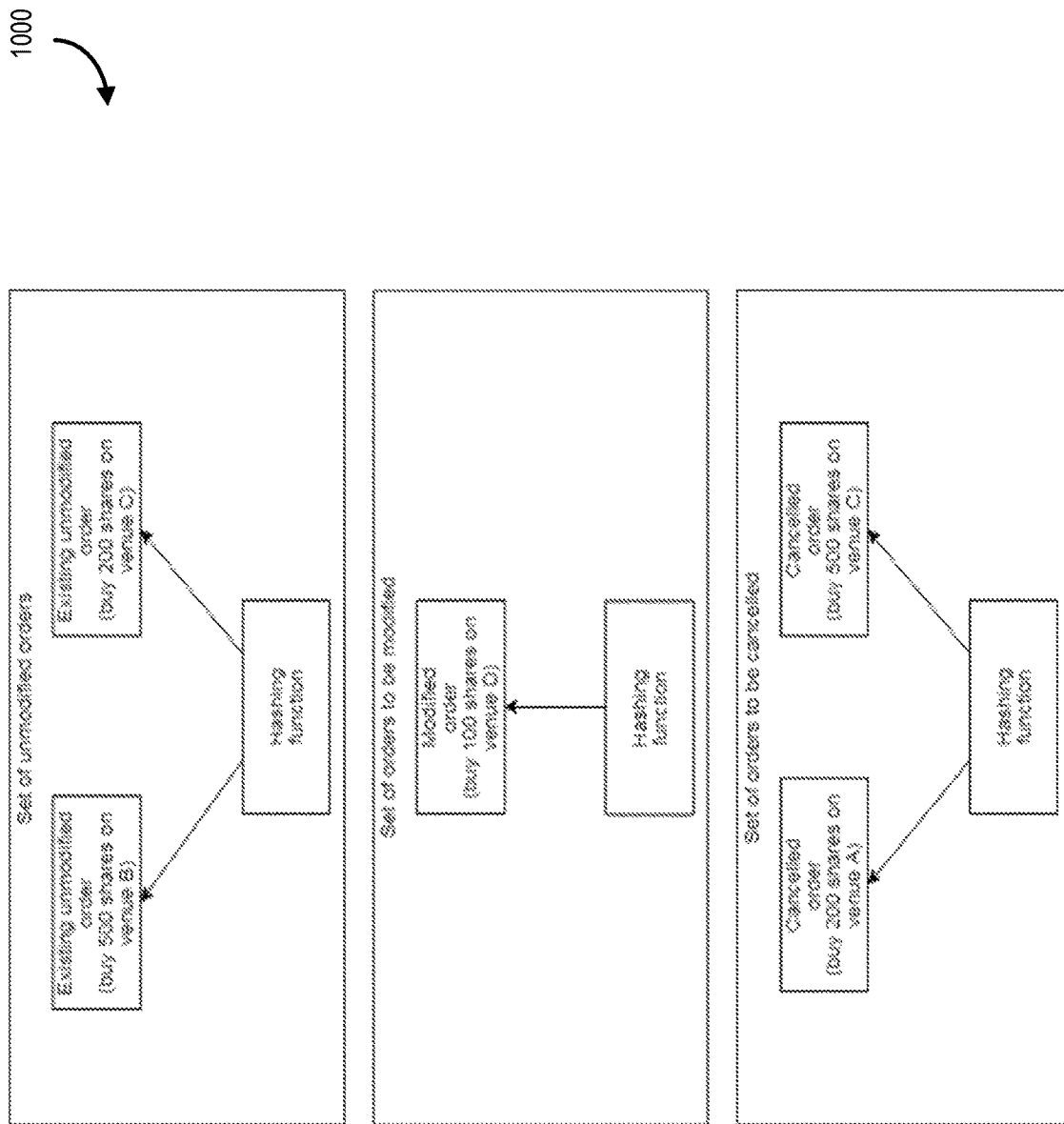

A first example is given in the diagrams 800, 900, and 1000, of FIG. 8, FIG. 9, and FIG. 10, respectively. The virtual order configuration consists of five orders.

Existing unmodified orders, represented in the first hash map
Buy 200 shares on venue A
Buy 500 shares on venue B
Buy 200 shares on venue C
Orders to be modified, represented in the second hash map
Buy 100 shares on venue D (originally 200 shares)
Orders to be cancelled, represented in the third hash map
Buy 500 shares on venue C In the first step, the system determines that the most optimal mutation is to remove 100 shares from the order to buy 200 shares on venue A.

In the representation of the virtual order configuration, this mutation is reflected by:
A) Removing the order from the "unmodified" set
B) Modifying the virtual quantity of the order to 100 shares
C) Adding the order to the "modified" set If this new configuration were implemented at this stage, an instruction would be sent to modify the quantity of this order (reduce from 200 shares to 100 shares), since it exists in the "modified" set.

In the second step, the system determines that the most optimal mutation is to further remove 100 shares from the order, so that it no longer represents any quantity.

In the representation of the configuration, this mutation is reflected by:
A) Removing the order from the "modified" set
B) Modifying the virtual quantity of the order to 0 shares
C) Adding the order to the "cancelled" set If the configuration were implemented at this stage, an instruction would be sent to cancel this order since it exists in the "cancelled" set, and no instruction would be sent to modify the quantity of this order since it no longer exists in the "modified" set.

Once the approach has converged on an optimal virtual order configuration, the sets corresponding to each state now correspond exactly to the instructions that need to be sent to the downstream controller to implement the optimal configuration.

This means that mutations to the virtual order configuration correspond to mutations to the set of implementing instructions, and no additional comparisons or state tracking is necessary to compute implementing instructions after the optimization, allowing the system to then quickly dispatch instructions without further intermediate calculations.

Since mutations to the virtual order configuration and to the implementing set are implemented as a set of additions/removals to hash maps corresponding to a known pair of states, each mutation is O (1) for all reasonably small sets of orders in the configuration.

This means the combined virtual order/instruction optimization algorithm is O(N), where N is the number of virtual order configurations sampled. For this reason, other improvements on the speed of the system can focus on reducing the number of steps taken. The optimal performance of this step is valuable in reducing the overall latency and improving throughput of the system.

Queue Priority

During execution of the stepwise optimization algorithm, mutations to the virtual order configuration may be made that cause an order to be downsized or cancelled.

In the case that multiple orders with the same venue/order type/order parameters may be downsized or cancelled and result in the same improvement to the overall optimality of the virtual order configuration, the order that was submitted the most recently will be chosen to be downsized or cancelled.

This is implemented in an efficient way using linked stack data objects. As child orders are submitted their representative in-memory data structures are encoded in stack data structures, such that for each venue/order type/order parameter combination, a stack exists with the most recently submitted orders at the top of the stack and the longest outstanding orders at the bottom of the stack.

When the system determines that quantity should be removed for a given venue/order type/order parameter combination, the orders at the top of the stack are considered first, and they are "popped" from the stack when cancelled (i.e. no longer outstanding).

Maintaining orders in stacks and removing quantity from the tops of the stacks first for each venue/order type/order parameter combination has the effect of leaving outstanding the orders on each venue with the highest "queue priority", as matching mechanisms implemented by most execution venues encapsulation "time priority", i.e. orders that have been outstanding longer are considered first for matching.

Higher queue priority has the following positive effects:
A) The probability that order will be filled is higher, leading to more immediate execution
B) The adverse selection profile given that the order will be filled is more favourable, since orders can be filled by smaller non-market-moving counterparties Instruction Priority Each of the data structures generated by mutating the virtual order configuration corresponds directly to a set of instructions. The instructions are grouped by message type (i.e. new, modify, and cancel) but are otherwise not guaranteed to be in the order they were generated in by mutating the virtual order configuration.

Due to the potential for trading to occur in-between the receipt of instructions by venues/exchanges, messages that reduce outstanding quantity must be sent to venues/exchanges before messages that add outstanding quantity, otherwise there is the potential for execution of both a new quantity that is being sent as well as execution of an outstanding quantity that is intended to be cancelled, which may cause a situation where the number of shares executed exceeds order instructions.

Furthermore, due to quote reversion phenomena, instructions to orders that result in removal of outstanding quantity are more latency-sensitive that those that result in addition of outstanding quantity.

These issues are avoided by sending instructions in the following order:
A) Cancels
B) Modifications
C) New orders The downstream controller may have implemented the instructions by a particular set of electronic FIX messages in a different order than output by the system, e.g. some messages may be delayed more than others in the case of latency normalization. However even in the case of latency normalization, messages sent to the same electronic recipient (i.e. exchange) should still be sent in the order given above.

Variable Step Sizes

An objective of order configuration optimization is to find the most favourable configuration, as implemented by the quantities of each order outstanding. Orders accepted by exchanges and by other matching mechanisms are usually allowed in sizes that are whole multiples of standard trading units (S.T.U.s or "boardlots").

Accordingly, in an embodiment, an objective of the optimization is to find the best quantity for each order as rounded to the nearest multiple of a boardlot.

However, while standard trading unit sizes are usually constant across different stocks and market situations (for most stocks the boardlot size is usually 100 shares), optimal order configurations may vary considerably from situation to situation in the total number of boardlots required.

Therefore, if the stepwise optimization algorithm is set to always increment/decrement order quantities by 1 boardlot (the highest possible fidelity), it may take considerably many steps in some situations to converge on a chosen order configuration (e.g., if boardlot size is 100 and optimal solution involves posting 20,000 shares, it would take at least 200 optimization steps).

This problem is solved by iterating progressively through a sequence of decreasing step sizes (starting with a large multiple of boardlots, ending with a single boardlot, and possibly having one or more intermediate step sizes), allowing the algorithm to begin by quickly finding approximate solutions and then continuing on with a smaller step size to find more precise solutions.

Reversion Quick Path

Quote reversion is a common scenario requiring the router to make quick changes to its order configuration.

Quote reversion is a rapid process in which selection indicators appear rapidly at the same time as other market participants cancel their orders, causing a burst of market data updates and requiring low latency as well as high throughput.

Once started, this process very quickly and predictably reaches a state where the optimal order configuration is to have no outstanding orders at the near touch (the "null" solution).

Regression models should quickly recognize these indicators and signal high potential for adverse selection, but stepwise optimization may take a long time to converge on the null solution.

Reversion quick path provides a quick initialization for the stepwise optimization approach. This problem is solved by checking the null solution first before stepping from a current solution.

The stepwise optimization algorithm kicks in after the reversion quick path is activated and will attempt to find a better state starting from the state where all orders are cancelled, but usually will not be able to.

The optimization algorithm itself may be able to get to the same place, but the quick path is a faster mechanism.

An example of this scenario is as follows:
1. The system has received an existing electronic order to buy 200 shares of IBM, with client ID "ABC123"
2. The current NBBO of IBM as last observed by the system through receipt of electronic market data is 25,000 shares to buy at 132.40 and 75,000 shares to sell at 132.41 (not including any orders implemented by the system and its downstream controller)
3. The system is using the following objective function:

$$Obj(\Omega) = \sum_{orders\ \omega \in \Omega} Prob(\omega) * Size(\omega) * [(\text{Midprice} - \text{Price}(\omega)) - Tox - \text{Fees}(\omega)]$$

where:
$\Omega$=the current order configuration, i.e. a set of orders $\omega$
$Prob(\omega)$=probability that order $\omega$ will be filled, as estimated by Model 1
$Size(\omega)$=outstanding quantity of order $\omega$ in shares
Midprice=the midpoint between the NBB and NBO prices, i.e. (132.40+132.41)/2=132.405
$Price(\omega)$=price of order $\omega$
Tox=adverse selection effect, i.e. the expected change in market price given that order $\omega$ is filled, as estimated by Model 2
$Fees(\omega)$=the trading fees for order $\omega$ given that it is filled
4. The system is configured using the following models:

a. Model 1: $Prob(\omega)=1/(1+\exp(-0.4771213*(1-0.01*\text{Self ExchQuoteSize}(\omega))))$ where:
   Self ExchQuoteSize($\omega$)=the total number of shares posted by the system with the same venue/order type/parameters b. Model 2: $Tox=0.01*(NBO\ size-NBB\ size)/(NBO\ size+NBB\ size)$ 5. The system is allowed to send two types of orders:
   a. Orders to buy at the NBB price on the NYSE, with no special modifiers (trading fee: $−0.0012 per share)
   b. Orders to buy at the NBB price on OBOE BZX, with no special modifiers (trading fee: $−0.0020 per share)
6. The system has currently implemented the order configuration $\Omega=\{\omega_1, \omega_2\}$, where:

a. $\omega_1$: 100 shares of IBM to buy at 132.40 on the NYSE. This order is identified to the downstream controller with unique identifying string "QORA000001".
b. $\omega_2$: 100 shares of IBM to buy at 132.40 on OBOE BZX. This order is identifier to the downstream controller with unique identifying string "QORA000002".

7. With the current implemented order configuration, the objective function is equal to:

$$Obj(\Omega)=Prob(\omega_1)*Size(\omega_1)*[(Midprice-Price(\omega_1))-Tox-Fees(\omega_1)]+Prob(\omega_2)*Size(\omega_2)*[(Midprice-Price(\omega_2))-Tox-Fees(\omega_2)]=0.5*100*[(132.405-132.40)-0.0050-(-0.0012)]+0.5*100*[(132.405-132.40)-0.0050-(-0.0020)]=0.5*100*0.0012+0.5*100*0.0020=0.16$$

Figure 11:
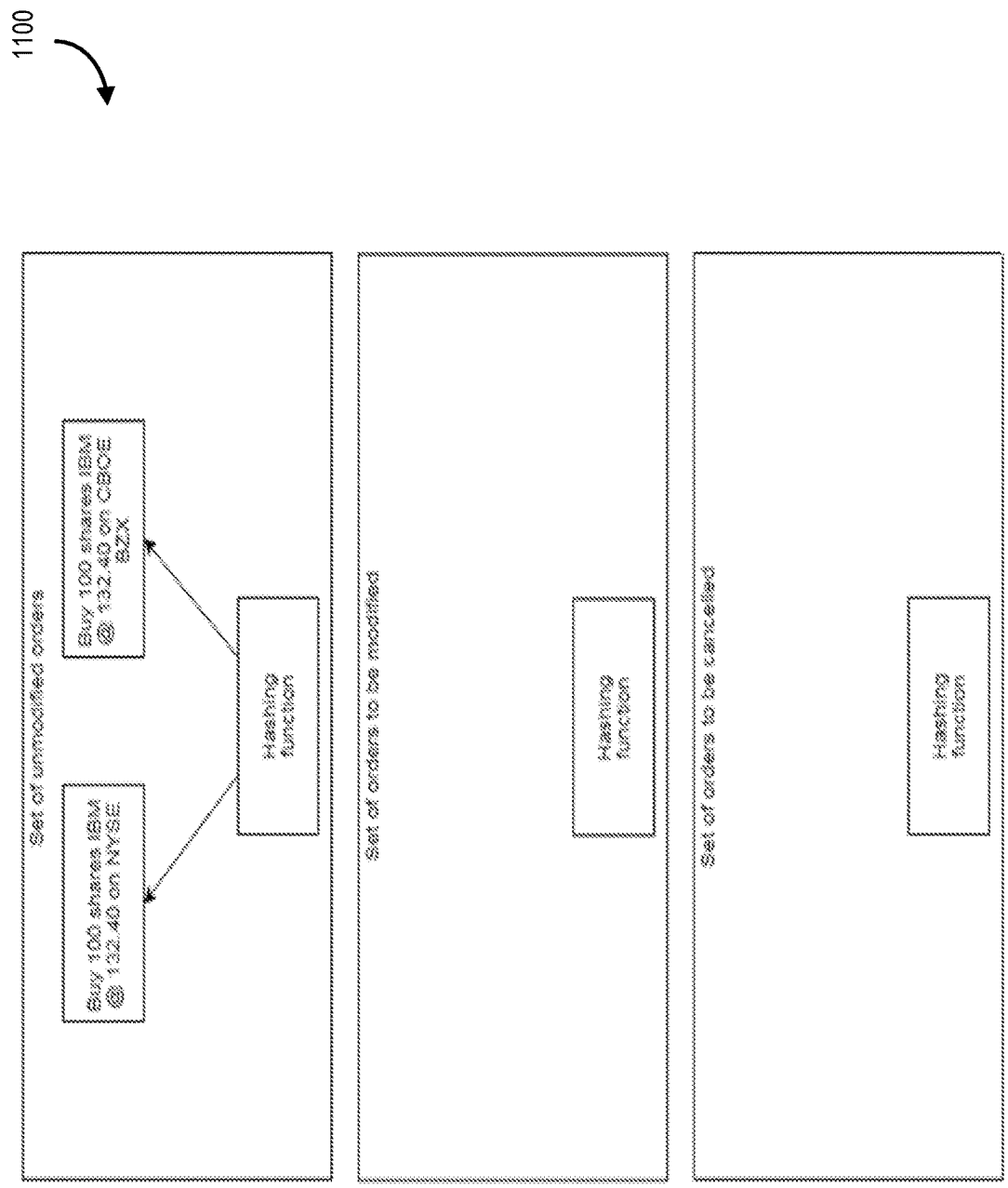
Figure 12:
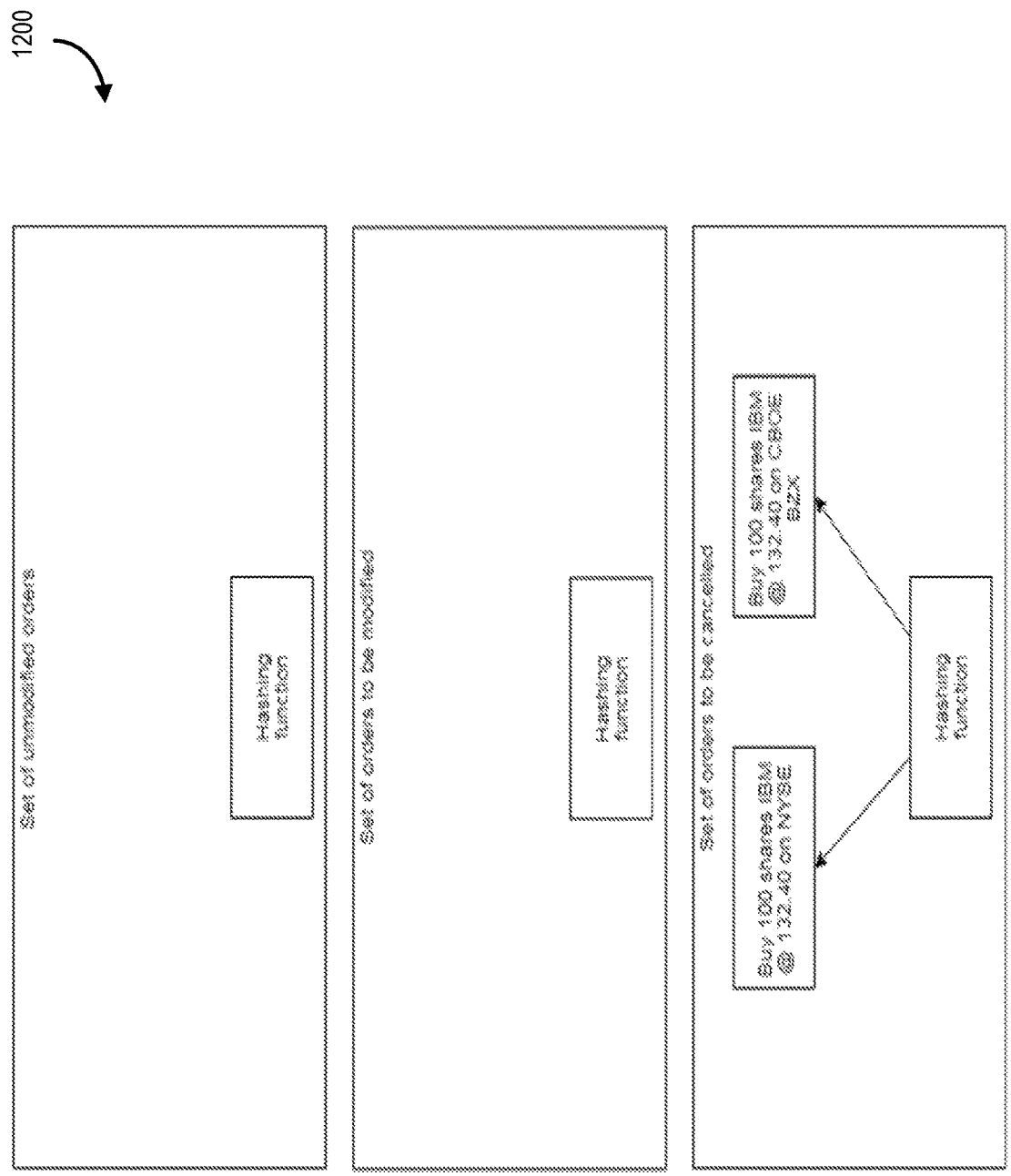

8. A new electronic dataset is received by the system over a direct market data feed indicating that the new NBB size is 5,000 (i.e. 20,000 shares has been removed from the NBB)
9. Model 2, which depends on the NBB size, is updated by a computer code subroutine. The recalculated adverse selection effect (i.e. Tox in the objective function) is now equal to 0.01*(75,000−5,000)/(75,000+5,000)=0.00875
10. All data structures representing order state are cleared. In-memory data structures representing orders $\omega_1$ and $\omega_2$ are both mapped into the hash map data structure representing the set of existing unmodified orders. The virtual order configuration has now been initialized to match the current realized order configuration (see the configuration 1100 shown in FIG. 11).
11. An address in memory is initialized to represent the floating point number zero. This address and floating point number will serve as an aggregator to evaluate the total value of the objective function. A computer code subroutine is activated which will loop over each memory address representing the current set of orders.
12. For order $\omega_1$:
   a. Model 1 is evaluated by a computer subroutine. The probability output by the model is equal to 0.5.
   b. The equation representing all contributions of order $\omega_1$ to the objective function is evaluated. The contribution is equal to:

$$Prob(\omega_1)*Size(\omega_1)*[(Midprice-Price(\omega_1))-Tox-Fees(\omega_1)]=0.5*100*[(132.405-132.40)-0.00875-(-0.0012)]=-0.1275$$

c. The result from evaluating the contribution of order $\omega_1$ is added to the floating point objective function aggregator. The aggregator is now equal to the value −0.1275.
13. For order $\omega_2$:
   a. Model 1 is evaluated by a computer subroutine. The probability output by the model is equal to 0.5.
   b. The equation representing all contributions of order $\omega_2$ to the objective function is evaluated. The contribution is equal to:

$$Prob(\omega_2)*Size(\omega_2)*[(Midprice-Price(\omega_2))-Tox-Fees(\omega_2)]=0.5*100*[(132.405-132.40)-0.00875-(-0.0020)]=-0.0875$$

c. The result from evaluating the contribution of order $\omega_2$ is added to the floating point objective function aggregator. The aggregator is now equal to the value −0.21.
14. The value of the objective function aggregator is updated. The value is compared to zero. Since the value is below zero, the reversion quick path is triggered.
15. The quantity of order $\omega_1$ is set to zero within its in-memory representation.
16. The mapping of the memory address of order $\omega_1$ within the hash map representing unmodified orders is removed.
17. Order $\omega_1$ is inserted into the hash map representing cancelled orders, i.e. a new mapping is created.
18. The quantity of order $\omega_2$ is set to zero within its in-memory representation.
19. The mapping of the memory address of order $\omega_2$ within the hash map representing unmodified orders is removed.
20. Order $\omega_2$ is inserted into the hash map representing cancelled orders, i.e. a new mapping is created.
21. The virtual order configuration now represents a configuration where both outstanding orders will be cancelled (see the configuration 1200 shown in FIG. 12).
22. The algorithm continues to the main stepwise optimization loop. In this case, the loop will determine based on the objective function that no additional changes should be made to the virtual order configuration.
23. A subroutine iterates over the memory addresses mapped by the hash map representing the set of orders to be cancelled.
24. At the first memory address, the data structure representing order $\omega_1$ is located. The data structure contains identifying information for order $\omega_1$ that maps it to the downstream controller, including its unique identifier string "QORA000001".
25. An electronic dataset is dispatched to the downstream controller containing the following information in the payload:

| | |
|---|---|
| Client order ID | "ABC123" |
| Order ID | "QORA000001" |
| MsgType | "F" (Order Cancel Request) |

26. At the second memory address, the data structure representing order $\omega_2$ is located. The data structure contains identifying information for order $\omega_2$ that maps it to the downstream controller, including its unique identifier string "QORA000002".
27. An electronic dataset is dispatched to the downstream controller containing the following information in the payload:

| | |
|---|---|
| Client order ID | "ABC123" |
| Order ID | "QORA000002" |
| MsgType | "F" (Order Cancel Request) |

28. A subroutine iterates over the memory addresses mapped by the hash map representing the set of orders to be modified. Since there are no orders represented in this data structure, no additional electronic datasets are dispatched to the downstream controller.
29. A subroutine iterates over the memory addresses mapped by the hash map representing the set of orders to be cancelled. Since there are no orders represented in this data structure, no additional electronic datasets are dispatched to the downstream controller.
30. The order configuration implemented by instructions to the downstream controller now represents the optimal order configuration, as discovered by the reversion quick path logic. The approach is completed and the system returns to awaiting further instructions and/or electronic datasets.

Additional Initialization

The main algorithm is designed to start from an initialized state of the virtual order configuration and make modifications to the state to find nearby states that have a higher score in order to find a better state, i.e. to refine the existing state by searching for nearby possibilities.

The advantages of starting with an initial state that is closer to an optimal state than a competing initial state are as follows:
1. Trajectories for the optimization algorithm that begin with a good initial state are more likely to lead to nearby states that are more optimal than those that can be found for a worse initial state (this is the problem in optimization of local minima). A better initial state can lead to finding a better optimal configuration, leading to better execution outcomes.
2. Trajectories between a good initial state and nearby optimal states are shorter than trajectories for a worse initial state. This means that a better initial state can lead to the algorithm converging in a shorter time, leading to lower latency and higher throughput.

For these reasons, the system 100 is capable of taking advantage of a good initialization to converge faster and on a better state. Therefore, if the system has access to a model that generates a good initial state quickly, even without that initial state needing to be optimal in itself, the system can be improved. Such models that might generate good initializations for the virtual order configuration in a short enough amount of time as not to increase the latency of the system include:
1. Existing smart order routing systems, such as those that implement curated computer logic rules in order to generate order configurations that are informed by quantitative analysis and human trader experience;
2. Low-fidelity machine learning models that are trained to reproduce final optimization results, given the same inputs or statistics and the same order parameters/datasets; and
3. Custom algorithms that make assumptions about the types of market conditions and order parameters that will be received by the system to quickly generate "best guesses" as to optimal order configurations Halting In order to control latency and reduce the frequency of cases where very high latency leads to poor performance, a time limit can be implemented after which the current virtual order configuration is implemented regardless of optimality.

Since the stepwise approach only updates the virtual order configuration when the new configuration has a better score than the current configuration, at any time the current virtual order configuration is guaranteed to have the same or better score than the realized order configuration downstream.

Halting the optimization algorithm at a time limit can provide time guarantees which are useful for controlling maximum latency scenarios for the system. A controlled maximum latency can provide for easier integration with upstream trading controllers.

Integration with Latency Normalization

The system can be integrated with a downstream controller that includes latency normalization to reduce information leakage and provide optimal liquidity capture for simultaneous order instructions.

In such a configuration, order instructions (as represented by electronic data sets) from the system are received by the downstream controller, and then they are interpreted and resent to further execution venue servers as electronic FIX messages, possibly with a delay between resending to account for network and processing latencies associated with implementation of the FIX message by the recipient execution venues in order than all recipient execution venues implement FIX messages as simultaneously as is possible.

This is done to reduce negative effects on liquidity capture and higher adverse selection and/or market impact due to information leakage causing other market participants to alter their behaviour in advance of the arrival of order messages.

Figure 13:
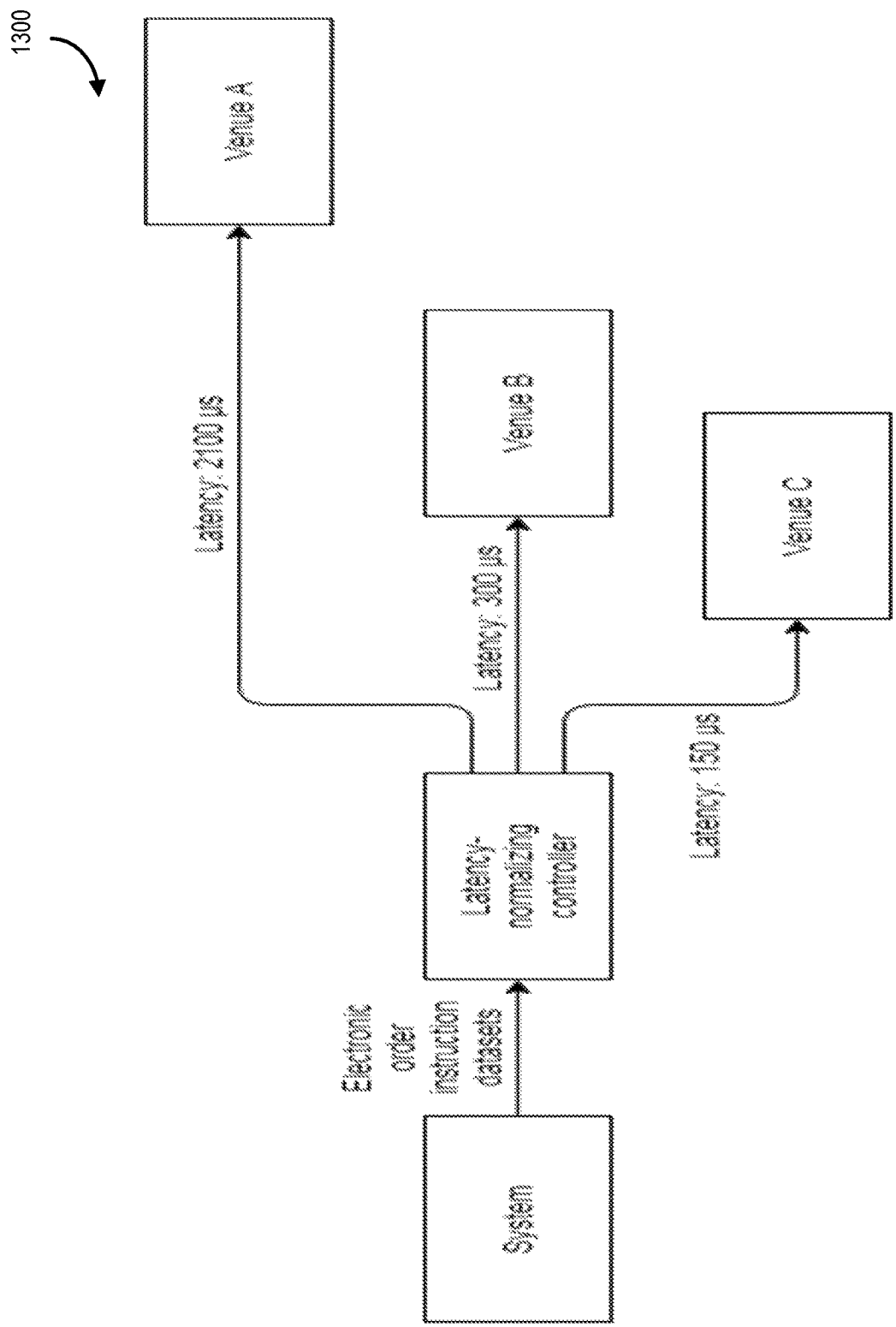
FIG. 13 is a diagram illustrating an example latency normalizing controller, according to some embodiments.

FIG. 13 is a diagram illustrating an example latency normalizing controller, according to some embodiments.

For example, as shown in 1300, in the implementation of the optimal order configuration, the system 100 decides to send electronic datasets to the downstream controller corresponding to the following three order instructions:
1. Buy 100 shares on Venue A
2. Buy 100 shares on Venue B
3. Buy 100 shares on Venue C Messages sent by the downstream controller to venues each have an expected latency before implementation by the recipient execution mechanism, due to latencies in network infrastructure, time taken to process outgoing servers by the host server, time taken to process incoming signals by the recipient server, and the speed of the electronic signal in the transmitting medium (i.e. the speed of the electrical impulse in cables, the speed of light in fiber-optic cables, or the speed of light through the atmosphere).

In this example, the average latency of signal to implementation at venue A is 2100 microseconds, the average latency at venue B is 300 microseconds, and the average latency at venue C is 150 microseconds. In order to affect implementation by the recipient venues as close to simultaneously as possible, the downstream controller will perform the following latency normalization:
1. Send an electronic dataset to Venue A indicating the desire to buy 100 shares
2. Wait 1800 microseconds, until the first dataset is approximately 300 microseconds from being implemented
3. Send an electronic dataset to Venue B indicating the desire to buy 100 shares
4. Wait 150 microseconds, until both the first and the second datasets are approximately 150 microseconds from being implemented by their respective venues
5. Send an electronic dataset to Venue C indicating the desire to buy 100 shares
6. Wait 150 microseconds
7. All three electronic datasets should now be in the near-simultaneous process of implementation by their respective venues In this way, the system can be configured and integrated with a latency-normalizing downstream controller such that all order instructions needed to implement an optimal order configuration are implemented by their respective execution venues in as simultaneous a manner as is possible, thus minimizing negative effects due to information leakage.

Instruction Sets

Instruction sets received by the system consist of electronic datasets transmitted by upstream controllers, i.e. execution algorithms, order management systems, traders, client servers, etc., with payloads providing order parameters that define the possibilities for optimal order configurations to by implemented by the system. Such parameters that might be received in an electronic payload are security identifiers, side indicators, order quantities, limit prices, execution start times, execution end times, maximum execution rates, upstream order identifiers, short sell indicators, account identifiers, trader identification codes, system identifiers, custom instructions, and other metadata and instructions.

An example of an electronic dataset that might be received by the system:

| | |
|---|---|
| Client order ID | "ABC123" |
| Currency | "USD" |
| Order ID | "DEF456" |
| Order Quantity | 1000 |
| Order type | "1" (Limit) |
| Price | 135.00 |
| SecurityID | "IBM" |
| SenderCompID | "FOO" |
| SenderSubID | "BAR" |
| SendingTime | "20190524-15:59:00.000" |
| Side | "1" (Buy) |
| Symbol | "IBM" |
| TargetCompID | "QORA" |
| TargetSubID | "QORA" |
| TimeInForce | "0" (Day) |

This example dataset would be interpreted as an order to buy 1000 shares of IBM stock with a maximum price of 135 USD.

Instruction sets transmitted by the system to the downstream controller consist of electronic datasets with payloads providing child order parameters that define the exact implementation of order quantities by execution venues.

Such parameters that might be transmitted in an electronic payload are security identifiers, side indicators, order quantities, limit prices, upstream order identifiers, short sell indicators, account identifiers, trader identification codes, system identifiers, custom instructions, and other metadata and instructions.

An example of an electronic dataset that might be transmitted by the system:

| | |
|---|---|
| Client order ID | "ABC123" |
| Currency | "USD" |
| Order ID | "QORA123" |
| Order Quantity | 100 |
| Order type | "1" (Limit) |
| Price | 134.50 |
| SecurityID | "IBM" |
| SenderCompID | "QORA" |
| SenderSubID | "QORA" |
| SendingTime | "20190524-15:59:00.001" |
| Side | "1" (Buy) |
| Symbol | "IBM" |
| TargetCompID | "NYSE" |
| TargetSubID | "NYSE" |
| TimeInForce | "0" (Day) |

System Hardware Configuration

To minimize latency, the system 100 can be configured to run on the same computer or in the same server rack as both upstream controllers and downstream DMA controller. In this configuration, order parameters are received as datasets into the computer over network configuration.

Upstream controllers perform processing on the order parameters to generate a set of child order parameters that will be accepted into the routing system either through shared memory or a local connection between two computers.

The routing system receives the child order parameters as a set of electronic instructions and performs its optimization to generate a set of order instructions that will be sent to the downstream DMA controller to implement the optimal virtual order configuration.

The downstream DMA controller will perform order state management and/or latency normalization functions, and will then transmit a set of electronic FIX messages to exchange servers or other electronic liquidity matching system servers, either over an internet connection or a direct connection to a co-located server in the same datacenter.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (e.g. personal computer, server, virtual environment, cloud computing system, network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for generating, within a constrained duration of time, transaction execution control signals for execution at one or more downstream processing venues representative of a desired trade request, the system comprising:
   a computer memory adapted to maintain a virtual order configuration data structure and a current order configuration data structure each representing data processes for routing electronic order messages using a series of child orders, the virtual order configuration data structure initialized based on the current order configuration data structure, wherein the virtual order configuration data structure is maintained in one or more memory location addresses mapped by one or more hash maps, the one or more hash maps adapted for reducing a level of computational complexity when transforming the virtual order configuration data structure into executable instruction sets; and a computer processor configured to:
   dynamically update the virtual order configuration data structure in accordance with a stepwise optimization mechanism, the stepwise optimization mechanism adapted to:
      for each child order in the series of child orders with a quantity parameter greater than or equal to a dynamically determined step size, evaluate a change in a contribution to an objective function score when the quantity of the child order is reduced by the dynamically determined step size;
      based on the evaluated change in the contribution to the objective function score when the quantity of the child order is reduced, for the child order in the series of child orders having a largest change in the contribution to the objective function score, iteratively modify the virtual order configuration data structure by iteratively removing one or more selected orders at the dynamically determined step size from the virtual order configuration data structure;
      after all removals are conducted, for each child order in the series of child orders with a quantity parameter greater than or equal to a dynamically determined step size, evaluate a change in a contribution to an objective function score when the quantity of the child order is increased by the dynamically determined step size;
      based on the evaluated change in the contribution to the objective function score when the quantity of the child order is increased, for the child order in the series of child orders having a largest change in the contribution to the objective function score, iteratively modify the virtual order configuration data structure by iteratively adding one or more selected orders at the dynamically determined step size from the virtual order configuration data structure continue iteratively modifying the virtual order configuration data structure until the determined contribution to the objective function score converges to a stable maximum objective function value on an optimal virtual order configuration or until the constrained duration of time has elapsed, wherein the constrained duration of time is dynamically determined from characteristics of the desired trade request through statistical models based in part on at least one of an order type, a number of securities to be traded, an identifier of the series to be traded, or execution characteristics of the one or more downstream processing venues;
   generate, in aggregate, as one or more data processes each corresponding to a corresponding downstream processing venue of the one or more downstream processing venues, the transaction execution control signals based on differences identified between the virtual order configuration data structure and the current order configuration structure;
   transmit the corresponding data processes to each of the corresponding one or more downstream processing venues for execution; and
   update the current order configuration data structure and the virtual order configuration data structure based on the execution of the transaction execution control signals at the one or more downstream processing venues;
   wherein the objective function has a plurality of parameters and decision variables and a requirement to be solved in the constrained duration of time; and
   wherein the dynamically determined step size initially is set at a larger step size and progressively reduced through a sequence of decreasing step sizes.

2. The system of claim 1, wherein the computer processor is further configured to: modify an execution order of the transaction execution control signals such that cancellation instructions are processed before modification instructions, and the modification instructions are processed before new order instructions are processed.

3. The system of claim 1, wherein the dynamically determined step size is a parameter based on multiples of boardlot sizes.

4. The system of claim 1, wherein the executable instruction sets include latency parameters that each correspond to the corresponding downstream processing venue.

5. The system of claim 1, wherein the computer processor is further configured to: evaluate the objective function score in a configuration where all orders are cancelled and trigger an evaluation shortcut when the objective function score represents a null solution before undertaking the iterative steps of the stepwise modification of the virtual order configuration data structure, and remove all orders from the virtual order configuration data structure.

6. The system of claim 1, wherein the computer processor resides within a smart order router hardware device.

7. The system of claim 1, wherein the transaction execution control signals are encapsulated as a data processes having a series of electronic FIX protocol messages.

8. A method for generating, within a constrained duration of time, transaction execution control signals for execution at one or more downstream processing venues representative of a desired trade request, the method comprising:

maintaining, by a computer processor, a virtual order configuration data structure and a current order configuration data structure, the virtual order configuration data structure initialized based on the current order configuration data structure each representing data processes for routing electronic order messages using a series of child orders, wherein the virtual order configuration data structure is maintained in one or more memory location addresses mapped by one or more hash maps, the one or more hash maps adapted for reducing a level of computational complexity when transforming the virtual order configuration data structure into executable instruction sets;

dynamically updating, by the computer processor, the virtual order configuration data structure in accordance with a stepwise optimization mechanism, the stepwise optimization mechanism adapted for:

for each child order in the series of child orders with a quantity parameter greater than or equal to a dynamically determined step size, evaluating a change in a contribution to an objective function score when the quantity of the child order is reduced by the dynamically determined step size;

based on the evaluated change in the contribution to the objective function score when the quantity of the child order is reduced, for the child order in the series of child orders having a largest change in the contribution to the objective function score, iteratively modifying the virtual order configuration data structure by iteratively removing one or more selected orders at the dynamically determined step size from the virtual order configuration data structure;

after all removals are conducted, for each child order in the series of child orders with a quantity parameter greater than or equal to a dynamically determined step size, evaluate a change in a contribution to an objective function score when the quantity of the child order is increased by the dynamically determined step size;

based on the evaluated change in the contribution to the objective function score when the quantity of the child order is increased, for the child order in the series of child orders having a largest change in the contribution to the objective function score, iteratively modifying the virtual order configuration data structure by iteratively adding one or more selected orders at the dynamically determined step size from the virtual order configuration data structure;

continue iteratively modifying, by the computer processor, the virtual order configuration data structure until the determined contribution to the objective function score converges to a stable maximum objective function value on an optimal virtual order configuration or until the constrained duration of time has elapsed, wherein the constrained duration of time is dynamically determined from characteristics of the desired trade request through statistical models based in part on at least one of an order type, a number of securities to be traded, an identifier of the series to be traded, or execution characteristics of the one or more downstream processing venues, generating, in aggregate, as one or more data processes each corresponding to a corresponding downstream processing venue of the one or more downstream processing venues, the transaction execution control signals based on differences identified between the virtual order configuration data structure and the current order configuration structure;

transmitting, by the computer processor, the corresponding data processes to each of the corresponding one or more downstream processing venues for execution; and updating, by the computer processor, the current order configuration data structure and the virtual order configuration data structure based on the execution of the transaction execution control signals at the one or more downstream processing venues;

wherein the objective function has a plurality of parameters and decision variables and a requirement to be solved in the constrained duration of time; and wherein the dynamically determined step size initially is set at a larger step size and progressively reduced through a sequence of decreasing step sizes.

9. The method of claim 8, comprising: modifying an execution order of the transaction execution control signals such that cancellation instructions are processed before modification instructions, and the modification instructions are processed before new order instructions are processed.

10. The method of claim 8, wherein the dynamically determined step size is a parameter based on multiples of boardlot sizes.

11. The method of claim 8, wherein the executable instruction sets include latency parameters that each correspond to the corresponding downstream processing venue.

12. The method of claim 8, comprising: evaluating the objective function score in a configuration where all orders are cancelled and triggering an evaluation shortcut when the objective function score represents a null solution before undertaking the iterative steps of the stepwise modification of the virtual order configuration data structure.

13. The method of claim 8, wherein the constrained duration of time is dynamically determined from characteristics of the desired trade request through statistical models based in part on at least one of an order type, a number of securities to be traded, an identifier of the series to be traded, or execution characteristics of the one or more downstream processing venues.

14. The method of claim 8, wherein the method is performed on a smart order router hardware device.

15. A non-transitory computer readable memory storing machine readable instructions, which when executed by a processor, cause the processor to perform a method for generating, within a constrained duration of time, transaction execution control signals for execution at one or more downstream processing venues representative of a desired trade request, the method comprising:

maintaining a virtual order configuration data structure and a current order configuration data structure, the virtual order configuration data structure initialized based on the current order configuration data structure each representing data processes for routing electronic order messages using a series of child orders, wherein the virtual order configuration data structure is maintained in one or more memory location addresses mapped by one or more hash maps, the one or more hash maps adapted for reducing a level of computational complexity when transforming the virtual order configuration data structure into executable instruction sets;

dynamically updating the virtual order configuration data structure in accordance with a stepwise optimization mechanism, the stepwise optimization mechanism adapted for:

for each child order in the series of child orders with a quantity parameter greater than or equal to a dynamically determined step size, evaluating a change in a contribution to an objective function score when the quantity of the child order is reduced by the dynamically determined step size;

based on the evaluated change in the contribution to the objective function score when the quantity of the child order is reduced, for the child order in the series of child orders having a largest change in the contribution to the objective function score, iteratively modifying the virtual order configuration data structure by iteratively removing one or more selected orders at the dynamically determined step size from the virtual order configuration data structure;

after all removals are conducted, for each child order in the series of child orders with a quantity parameter greater than or equal to a dynamically determined step size, evaluate a change in a contribution to an objective function score when the quantity of the child order is increased by the dynamically determined step size;

based on the evaluated change in the contribution to the objective function score when the quantity of the child order is increased, for the child order in the series of child orders having a largest change in the contribution to the objective function score, iteratively modifying the virtual order configuration data structure by iteratively adding one or more selected orders at the dynamically determined step size from the virtual order configuration data structure;

continue iteratively modifying the virtual order configuration data structure until the determined contribution to the objective function score converges to a stable maximum objective function value on an optimal virtual order configuration or until the constrained duration of time has elapsed, wherein the constrained duration of time is dynamically determined from characteristics of the desired trade request through statistical models based in part on at least one of an order type, a number of securities to be traded, an identifier of the series to be traded, or execution characteristics of the one or more downstream processing venues, generating, in aggregate, as one or more data processes each corresponding to a corresponding downstream processing venue of the one or more downstream processing venues, the transaction execution control signals based on differences identified between the virtual order configuration data structure and the current order configuration structure;

transmitting the corresponding data processes to each of the corresponding one or more downstream processing venues for execution; and updating the current order configuration data structure and the virtual order configuration data structure based on the execution of the transaction execution control signals at the one or more downstream processing venues; and wherein the objective function has a plurality of parameters and decision variables and a requirement to be solved in the constrained duration of time; and wherein the dynamically determined step size initially is set at a larger step size and progressively reduced through a sequence of decreasing step sizes.

* * * * *